United States Patent
Nonaka et al.

(10) Patent No.: US 8,502,883 B2
(45) Date of Patent: Aug. 6, 2013

(54) PHOTOGRAPHING APPARATUS AND PHOTOGRAPHING CONTROL METHOD

(75) Inventors: Osamu Nonaka, Sagamihara (JP); Yoshinori Matsuzawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 189 days.

(21) Appl. No.: 13/030,854

(22) Filed: Feb. 18, 2011

(65) Prior Publication Data
US 2011/0273607 A1 Nov. 10, 2011

(30) Foreign Application Priority Data
Feb. 19, 2010 (JP) .................................. 2010-035148

(51) Int. Cl.
*H04N 9/73* (2006.01)
*H04N 5/222* (2006.01)

(52) U.S. Cl.
USPC .................................. 348/224.1; 348/333.08

(58) Field of Classification Search
USPC ............. 348/333.08, E05.024, 208.11, 240.1, 348/E5.044, 224.1
See application file for complete search history.

(56) References Cited

U.S. PATENT DOCUMENTS

| | | | |
|---|---|---|---|
| 5,168,363 A * | 12/1992 | Kojima et al. | 348/704 |
| 5,229,862 A * | 7/1993 | Takahashi et al. | 386/241 |
| 5,321,456 A * | 6/1994 | Yoon | 396/383 |
| 5,923,816 A * | 7/1999 | Ueda | 386/230 |
| 6,614,999 B2 * | 9/2003 | Hagiuda et al. | 396/155 |
| 8,253,823 B2 * | 8/2012 | Shibuno et al. | 348/231.4 |
| 2009/0322969 A1 * | 12/2009 | Unger | 348/790 |

FOREIGN PATENT DOCUMENTS
JP 2008-005240 1/2008

\* cited by examiner

*Primary Examiner* — Tuan Ho
*Assistant Examiner* — Chan Nguyen
(74) *Attorney, Agent, or Firm* — John C. Pokotylo; Straub & Pokotylo

(57) ABSTRACT

When an interchangeable lens in which a memory that records image data is provided is mounted to a camera main body including a display section that displays an image, a signal processing and control section of the camera main body reads in a sample image that is previously stored in the memory. The sample image serves as a model with respect to an image that can be photographed by the interchangeable lens. The sample image is displayed by the display section for a predetermined time. Thereafter, the signal processing and control section performs display control that switches the display of the display section so as to display an image in which a subject is picked up by the interchangeable lens and the image pickup section.

20 Claims, 16 Drawing Sheets

PHOTOGRAPHING APPARATUS AND PHOTOGRAPHING CONTROL METHOD

This application claims benefit of Japanese Application No. 2010-35148 filed in Japan on Feb. 19, 2010, the contents of which are incorporated by this reference.

BACKGROUND OF THE INVENTION

1. Field of the Invention

The present invention relates to a photographing apparatus to which a detachable interchangeable lens is mounted to perform photographing, and to a photographing control method.

2. Description of the Related Art

Recently, portable devices with a photographing function and photographing apparatuses such as digital cameras have put image processing to full use to enable favorable photographing in various kinds of photographing scenes.

Further, by mounting and detaching interchangeable lenses that have various features to such kind of photographing apparatuses and utilizing the interchangeable lenses for photographing, it is possible to further extend the range of photographing scenes.

The greater the kinds of such interchangeable lenses that are available, the wider the range of needs that can be satisfied, and therefore many manufacturers have prepared a large line-up of interchangeable lenses.

Meanwhile, according to an example of the conventional art that is described in Japanese Patent Application Laid-Open Publication No. 2008-5240, a detachable second memory is provided in addition to a first memory that is built into a camera, and a switch is provided that stores data recorded in the second memory in the first memory.

Thus, there is also a trend to provide a memory inside a device.

The aforementioned example of the conventional art is configured so that photographic data that has been photographed with another camera or the like and recorded in a second memory can be easily stored in a first memory built into the camera in question.

As in the aforementioned example of the conventional art that is described in an official gazette, in the case of a digital camera or a portable telephone, in many cases in a dedicated memory card is exclusively used for recording images.

This is because a memory card can be easily removed from a photographing apparatus main body, and consequently can be easily passed to another device such as a printer, a personal computer (PC), or a camera.

SUMMARY OF THE INVENTION

According to one aspect of the present invention, there is provided a photographing apparatus to which a detachable interchangeable lens is selectively mounted to perform photographing, including: an image pickup section including an image pickup device that is disposed at an image forming position of the interchangeable lens; a recording section that is provided in the interchangeable lens and that records image data including an image; a display section that displays an image; and a display control section that performs display control that can switch between a first display mode that reads out an image recorded in the recording section inside the interchangeable lens and displays the image on the display section and a second display mode that displays an image that is being picked up by the image pickup section through the interchangeable lens on the display section.

According to another aspect of the present invention, there is provided a photographing control method for performing photographing by means of a photographing apparatus in which a detachable interchangeable lens is mounted to a photographing apparatus main body, including: a first display step of performing control that displays a sample image that is photographed using the interchangeable lens that is mounted or an interchangeable lens that has same characteristics as the interchangeable lens and is previously recorded inside the interchangeable lens that is mounted, by means of a display section of the photographing apparatus main body; a second display step of performing control that displays an image that is actually photographed using the interchangeable lens by means of the display section of the photographing apparatus main body; and a setting step of performing control that reads out a photographing condition for photographing the sample image, and sets the photographing condition as a photographing condition of the photographing apparatus.

DETAILED DESCRIPTION OF THE PREFERRED EMBODIMENTS

Hereunder, an embodiment of the present invention is described with reference to the drawings.

Figure 1:
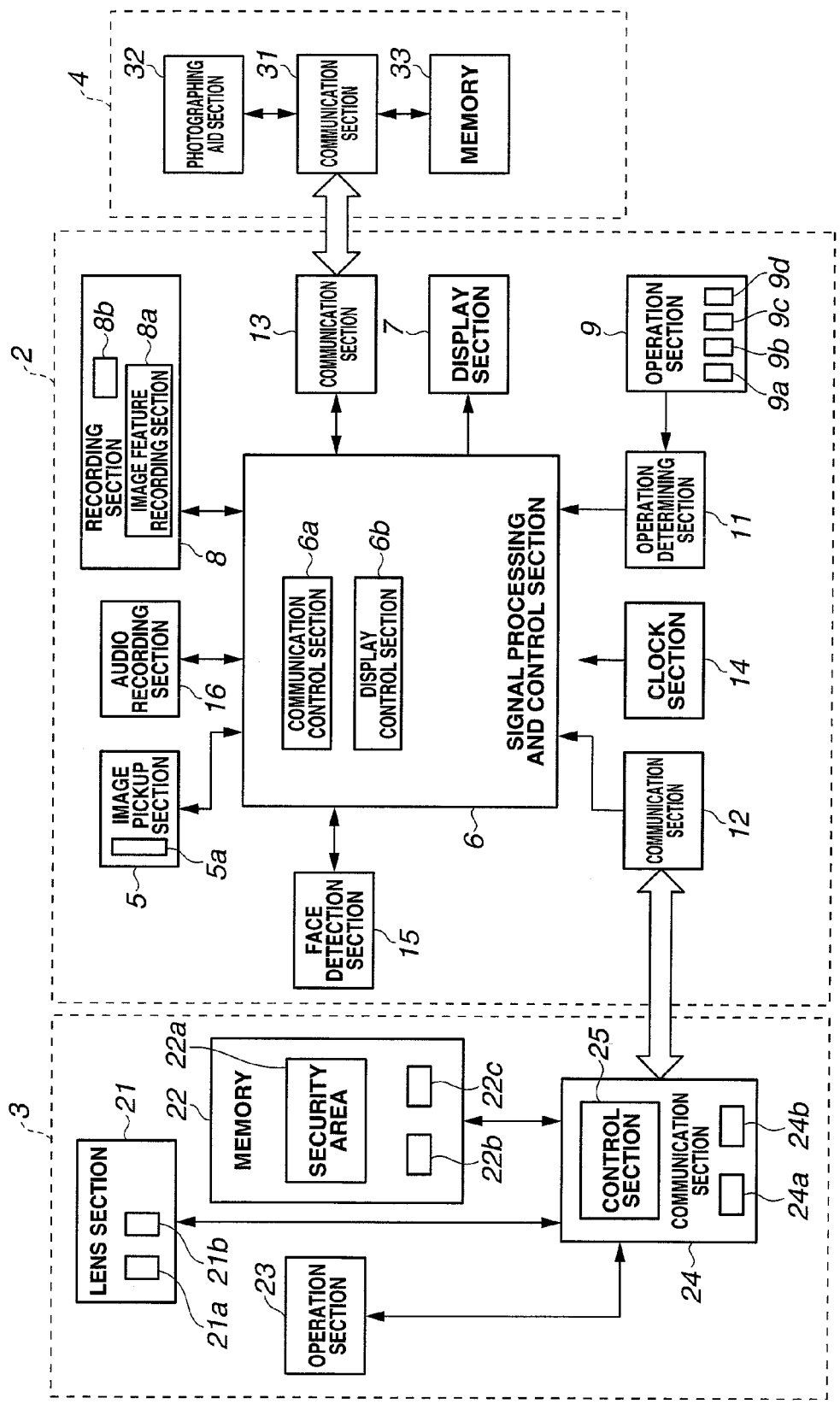
FIG. 1 is a block diagram that illustrates an internal configuration of a camera according to an embodiment of the present invention.

As shown in FIG. 1, a camera 1 according to a first embodiment of a photographing apparatus of the present invention includes a camera main body 2 as a photographing apparatus main body, an interchangeable lens 3 that is detachably mounted to the camera main body 2, and an accessory apparatus 4 that is detachably mounted to the camera main body 2.

Figure 2A:
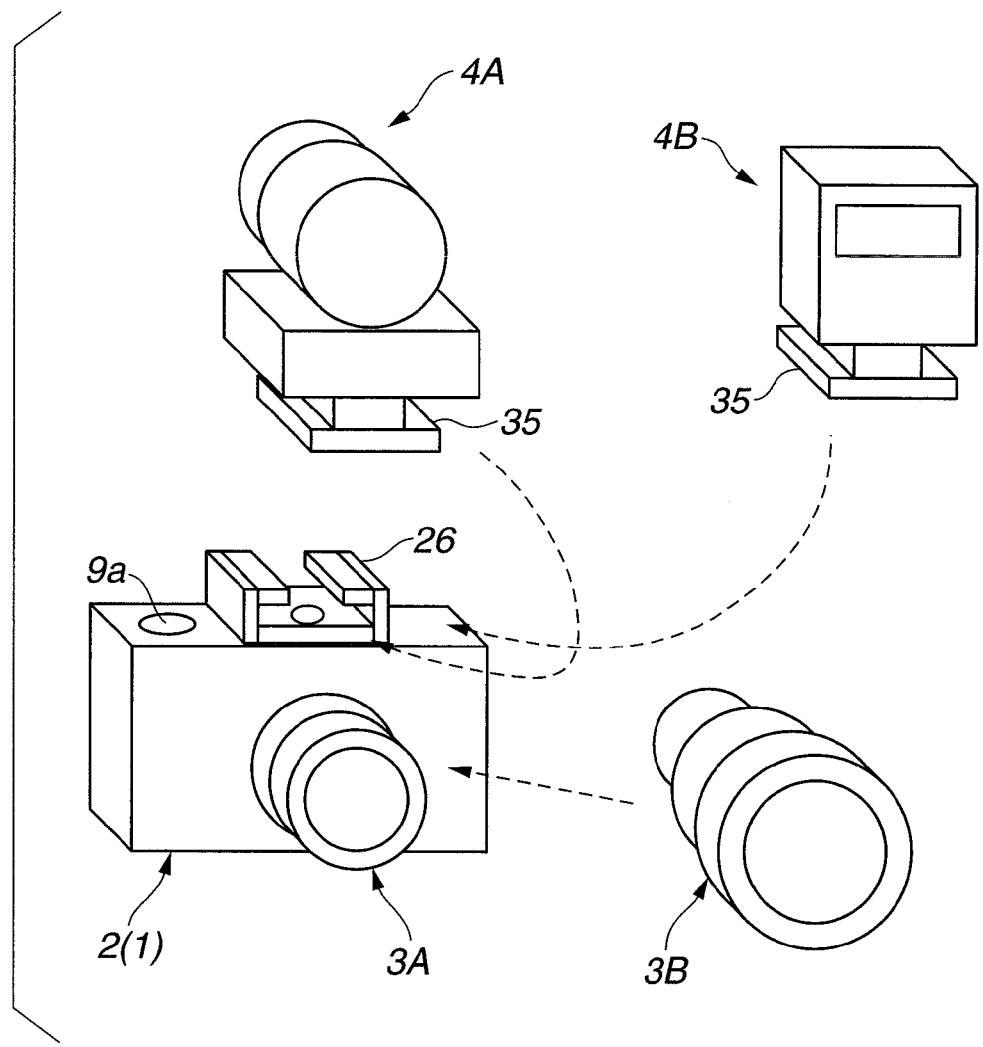
FIG. 2A is a view that illustrates an interchangeable lens that can be detachably exchanged and detachably mounted to a camera main body, and an accessory apparatus used as a photographing aid according to an embodiment of the present invention.

A mount portion for detachably mounting the interchangeable lens 3 is provided, for example, in the vicinity of the center of the front surface of the camera main body 2. As shown in FIG. 2A, interchangeable lenses 3 such as, for example, a wide-angle lens 3A for performing wide-angle photography or a telephoto lens 3B for magnifying and photographing a subject at a long distance from the lens can be selectively mounted to the mount portion.

Further, as shown in FIG. 2A and the like, a mount portion for an accessory apparatus (hereunder, referred to simply as "mount portion") 26 that has a concave shape is provided in the vicinity of the center of the upper surface of the camera main body. A mount portion 35 at a proximal end of an accessory apparatus 4 used as a photographing aid such as an electronic viewfinder (EVF) 4A or a flash emission apparatus 4B can be detachably mounted to the mount portion 26.

As shown in FIG. 1, an image pickup section 5 including an image pickup device 5a whose image pickup surface is disposed at an image forming position at which a subject image is formed by the interchangeable lens 3, and a signal processing and control section 6 that performs control such as signal processing with respect to an image pickup signal (that is, a picked-up image signal) that is an electrical signal obtained by subjecting a subject image to photoelectric conversion by means of the image pickup device 5a as well as display control and the like are provided inside the camera main body 2.

Figure 3A:
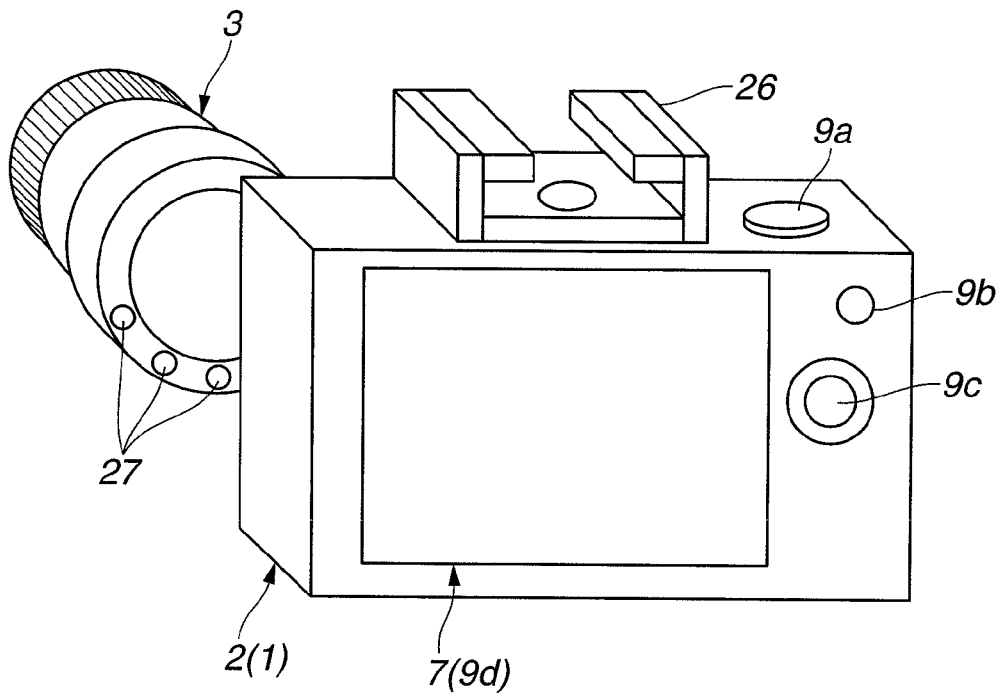
FIG. 3A is an explanatory drawing that illustrates a state before mounting a photographing lens to a camera main body according to an embodiment of the present invention.
Figure 3B:
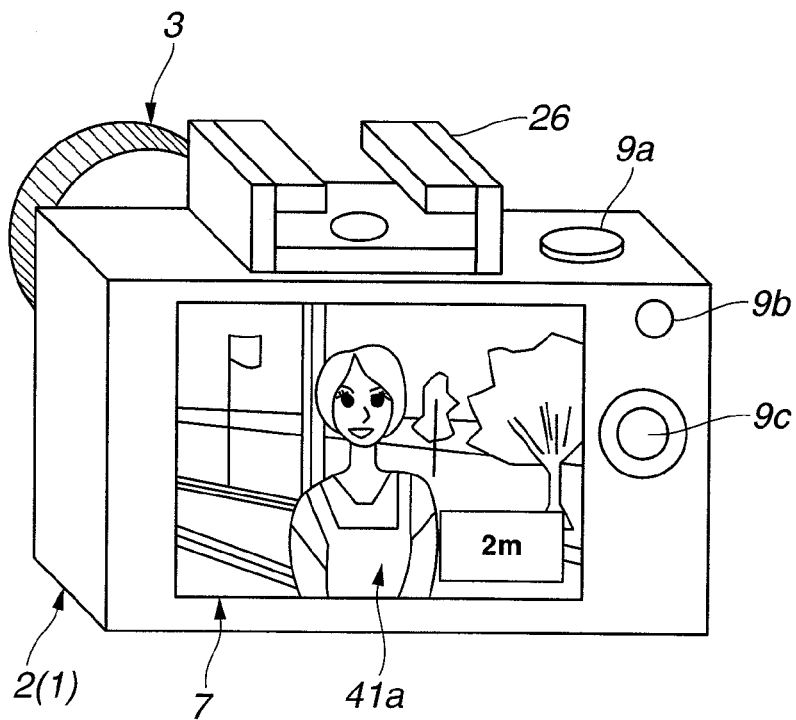
FIG. 3B is an explanatory drawing that illustrates a display example of a sample image after mounting a photographing lens to a camera main body according to an embodiment of the present invention.

Further, as shown in FIG. 3B and the like, the camera main body 2 has a display section 7 that displays an image on a rear surface of the camera main body 2. The signal processing and control section 6 generates an image that is displayed on the display section 7 by performing signal processing with respect to an image pickup signal (picked-up image). Note that displaying a picked-up image that is picked up by the image pickup section 5 on the display section 7 is also referred to as "displaying a through image". Further, it is assumed that the signal processing section has a so-called resizing function that reduces an image size by thinning out pixels, addition, or changing a compression rate or the like.

The camera main body 2 also includes a recording section 8 that records a photographic image and an operation section 9 that performs various operations such as a release operation as a photographing instruction operation (referred to simply as "operation").

When various kinds of operations are performed from the operation section 9 by a user 10 (refer to FIG. 2B and the like) as an operator that is performing photographing, an operation determining section 11 determines that an operation of the operation section 9 has been performed, and outputs the result that is determined to the signal processing and control section 6. The signal processing and control section 6 performs control operations in accordance with the result that is determined.

For example, in a case where the user 10 operates a release button 9a to perform a release (that is, photographing) operation, the operation determining section 11 determines that a release operation is performed. In accordance with the determined result, the signal processing and control section 6 performs compression processing with respect to the image pickup signal, and records the compressed signal as a photographic image in the recording section 8. According to the present embodiment, when recording a photographic image in the recording section 8, information regarding the photographing conditions is also recorded. Accordingly, the photographic image and photographing conditions are recorded as image data in the recording section 8. In this connection, a configuration may also be adopted in which the signal processing and control section 6 has the function of the operation determining section 11.

As shown in FIG. 3A and the like, a menu switch 9b for performing a menu operation, a dial button 9c that is rotated to change the contents of an operation, and a touch panel 9d that is operated by touching the display section 7 are provided on the rear surface of the camera main body 2. Note that a configuration may also be adopted in which only one of the dial button 9c and the touch panel 9d, and not both thereof, is provided.

Figure 2B:
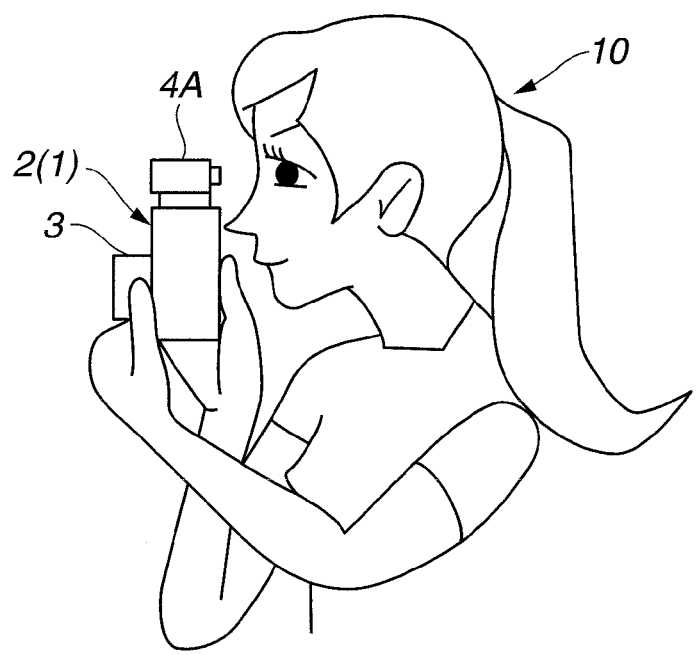
FIG. 2B is a view that illustrates a state in which an electronic viewfinder is mounted to a camera main body and a user observes a result of picking up an image according to an embodiment of the present invention.
Figure 2C:
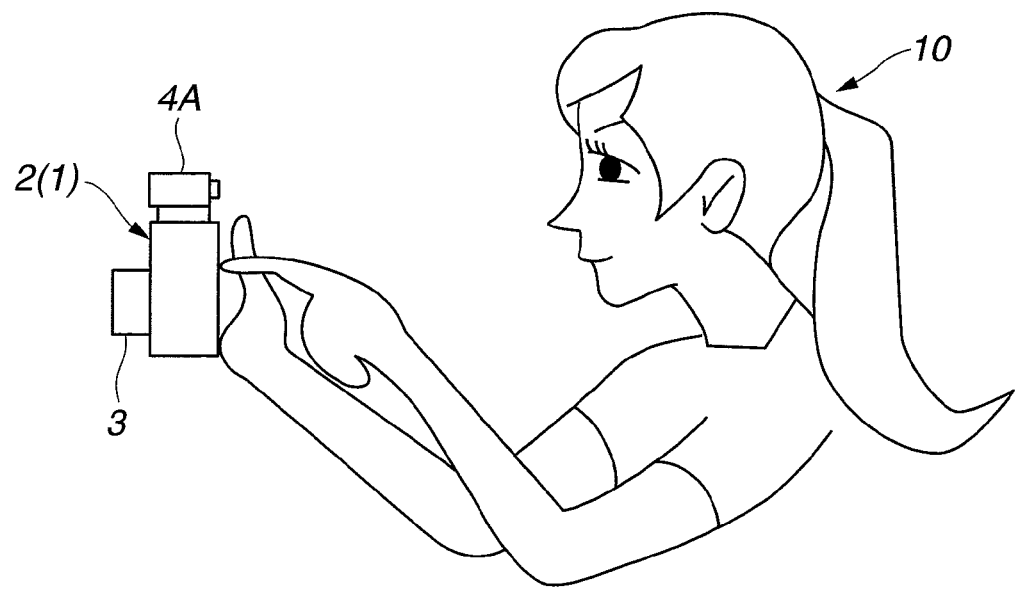
FIG. 2C is an explanatory drawing of a state in which selection of a display mode is being performed with respect to a display section provided on a rear surface of a camera main body according to a first embodiment of the present invention.

As shown in FIG. 2C, the present embodiment is configured so that the user 10 can operate the menu switch 9b to perform an operation such as a mode selection, described later, while checking the display on the display section 7.

The camera main body 2 also includes a communication section 12 for performing communication with the (communication section 24 of the) interchangeable lens 3, a communication section 13 for performing communication with the (communication section 31 of the) accessory apparatus 4, a clock section 14 for measuring time in order to record the photographing date and time when recording a photographic image in the recording section 8, and an audio recording section 16 for recording sound. Note that, when recording a photographic image, a sound that is recorded by the audio recording section 16 can also be recorded.

The camera main body 2 also has a face detection section 15 that detects a shading pattern that has features of a human face from an image that is picked up. When recording an image in the recording section 8, feature values that show features of the image, such as the size and position of a face or the number of faces therein, as a detection result that is detected by the face detection section 15 are also recorded in an image feature recording section 8a of the recording section 8.

A configuration may also be adopted in which, in addition to the face detection section 15, an image feature detection section is provided that detects feature values such as whether an image recorded in the recording section 8 is an image of a person or of scenery or the like.

Further, as described hereunder, in a case where signal processing and control section 6 acquires image data from the interchangeable lens 3 side, although the image data may be temporarily recorded in the recording section 8, a configuration may also be adopted in which a memory other than the recording section 8 is provided for performing temporary recording.

The interchangeable lens 3 has a lens section 21 that includes a zoom mechanism 21a and a diaphragm 21b, and a memory 22 as a recording section that is capable of recording a control program that drives the lens section 21 and image data that includes a sample image and information regarding the photographing conditions thereof.

It is assumed that a sample image is, for example, an image that a professional photographer or a photography instructor obtains by photographing a scene or a subject by making use of the features of the interchangeable lens 3 in question, so that the user 10 can experience characteristics such as a background blur or a magnification effect of the interchangeable lens 3 without going to the location of such a scene or searching for an appropriate subject. Hence, preferably a sample image is an attractive image with vivid colors or the like that expresses the features of the relevant interchangeable lens 3. For example, if the interchangeable lens 3 is a wide-angle lens, a sample image is an image of magnificent scenery that effectively utilizes width in the angle of view, while if the interchangeable lens 3 is a telephoto lens, a sample image is an image in which a distant object is photographed in a large size and the background is blurred or the like. If the interchangeable lens 3 is a zoom lens, in order to be able to show the appeal of the magnifying power thereof, sample images are images in which a wide-angle image and a telephoto image are arranged and the like. Naturally, a configuration may be adopted that allows the user 10 to record an image which the user 10 finds satisfying and feels it was particularly worthwhile photographing using the interchangeable lens 3.

The memory 22 is configured to enable setting of a security area 22a in which mainly the possessor of the interchangeable lens 3 can record image data and the like while ensuring the security thereof. For example, a non-volatile rewritable semiconductor memory such as a flash memory can be used as the memory 22. In this connection, the security area is set using a known algorithm for ensuring security or a security IC or the like.

The user can set an empty area of an arbitrary size in the overall recording area of the memory 22 as the security area 22a. In the case of image data for which it is not necessary to ensure security, the user 10 can record the image data in a recording area (referred to as "normal area") other than the security area 22a in the memory 22.

In this connection, for example, a sample image to serve as an example that is photographed by an interchangeable lens 3 that has the same characteristics as the interchangeable lens 3 in question and information regarding photographing conditions such as a zoom magnification and a shutter speed when the sample image was photographed are recorded in the normal area in the memory 22 at the time of factory shipment.

Further, a plurality of images for which these photographing conditions have been changed are prepared and, as described later, a configuration is adopted so that a sample image that is displayed can be changed in accordance with the photographing conditions and the like. In order to record a plurality of image data, it is better for the image data in question to be stored by each interchangeable lens 3, and not in the camera main body 2. Note that it is assumed that the image data is utilized by being displayed on the display section 7 on the rear surface of the camera main body 2, and therefore the image data need only have a resolution that appears normal to the user when the image data is displayed. It is thereby possible to perform communication at a high speed and to also record a plurality of images. The memory 22 also has an identification information recording section 22b that records identification information (abbreviated to "ID") that corresponds to the features and function of the lens section 21 of the respective interchangeable lenses 3.

Further, an image that the user 10 has photographed using the interchangeable lens 3 that is actually mounted to the camera main body 2 (or an interchangeable lens with the same characteristics) can also be added and recorded as a sample image in the security area 22a or normal area in the memory 22.

In such a case, information regarding the photographing conditions at the time of photographing using the interchangeable lens 3 can also be recorded. According to FIG. 1, an example is illustrated in which the information recording section 22c that records this information is provided inside the normal area. Note that a configuration may also be adopted in which the information recording section 22c is formed in the security area 22a.

The interchangeable lens 3 has an operation section 23 for performing a focusing operation of the lens section 21, an operation that alters the zoom magnification of the zoom mechanism 21a, and an operation for adjusting a diaphragm value. The interchangeable lens 3 also has a communication section 24 that conducts communication with the communication section 12 of the camera main body 2.

In a state in which the interchangeable lens 3 is mounted to the camera main body 2, when the user 10 performs a zoom operation or the like with respect to the mounted interchangeable lens 3 from the operation section 23, the communication section 24 sends information corresponding to the operation of the operation section 23 to the signal processing and control section 6 via the communication section 12 of the camera main body 2. Thus, the signal processing and control section 6 is made aware of the operation at the operation section 23 and performs a control operation corresponding to the relevant operation.

Further, when the interchangeable lens 3 is mounted to the camera main body 2, the signal processing and control section 6 ascertains the type and functions and the like of the interchangeable lens 3 that is actually mounted based on the information of the identification information recording section 22b in the memory 22.

In this connection, the communication section 24 has a control section 25 that controls the actions of the interchangeable lens 3. When the operation section 23 of the interchangeable lens 3 is operated or when a control operation with respect to the interchangeable lens 3 is performed from the camera main body 2 or the like, the control section 25 appropriately controls each section of the interchangeable lens 3. The communication section 24 is equipped with communication functions of both a photographing control communication section 24a that performs communication for photographing control and an image communication section 24b that performs image transfer, with respect to communication with the communication section 12 of the camera main body 2. Although both of the communication functions are specifically illustrated on the interchangeable lens 3 side in FIG. 1, the communication section 12 is also equipped with the same functions.

In this connection, for example, as shown in FIG. 3A, a plurality of communication terminals 27 for performing communication with the communication section 12 of the camera main body 2 are provided on a mount portion at a proximal end of the interchangeable lens 3. The communication section 24 performs communication of data such as clock data, image data, and control data by utilizing a handshake protocol or the like with respect to the communication section 12 of the camera main body 2 through the communication terminals 27.

Although an example in which the communication terminals 27 are provided as metal contacts is illustrated in FIG. 3A, the present invention is not limited thereto, and non-contact communication means may be used without providing metal contacts.

According to the present embodiment, the signal processing and control section 6 has a function that performs control that records image data recorded in the recording section 8 in the security area 22a or the normal area of the memory 22 via the communication sections 12 and 24.

Further, when the interchangeable lens 3 is detached and mounted to another camera main body (assumed as being denoted by reference numeral 2'), the (signal processing and control section 6 of the) other camera main body 2' can copy the image data recorded in the interchangeable lens 3 and record the data in the recording section 8. More specifically, passing of image data can be performed via the interchangeable lens 3.

Thus, the signal processing and control section 6 according to the present embodiment has a function of a communication control section 6a that carries out communication control with the communication section 24 of the interchangeable lens 3 by means of the communication section 12. The communication control section 6a has a function that transfers image data bidirectionally with respect to the recording section 8 of the camera main body 2 and the memory 22 of the interchangeable lens 3 via the communication sections 12 and 24.

The communication control section 6a also controls communication of the communication section 13 that performs communication with a communication section 31 provided in the accessory apparatus 4. As shown in FIG. 2A and the like, when the mount portion 35 of the accessory apparatus 4 such as an EVF 4A is mounted in the mount portion 26 at the center of the upper surface of the camera main body 2, conduction occurs between unshown communication terminals.

The signal processing and control section 6 transmits image data or control signals or the like via the communication sections 13 and 31 that enter a conducting state through the communication terminals.

As shown in FIG. 1, the accessory apparatus 4 has a photographing aid section 32 that aids photographing and a memory 33 as a recording section that can record image data and the like. The user 10 can record image data in the memory 33 provided in the accessory apparatus 4.

When the accessory apparatus 4 is the EVF 4A as shown in FIG. 2A, the photographing aid section 32 has a function that displays an image that is picked up by the camera main body 2 on the viewfinder display section of the EVF 4A. FIG. 2B illustrates the manner in which, when the EVF 4A is mounted to the camera main body 2, the user 10 performs a photographing operation while bringing the eyes of the user 10 close to the viewfinder display section of the EVF 4A to view a picked-up image.

Further, when the accessory apparatus 4 is the flash emission apparatus 4B as shown in FIG. 2A, the photographing aid section 32 has a function of a flash emission section that emits a flash.

Note that, a mount portion of an optical viewfinder (OVF) can also be mounted to the mount portion 26.

The signal processing and control section 6 according to the present embodiment also has a function of a display control section 6b that changes a display mode (display form) that is displayed on the display section 7 in accordance with the interchangeable lens 3 that is mounted to the camera main body 2 as shown in FIG. 3A and FIG. 3B.

FIG. 3A shows a state before the interchangeable lens 3 is mounted. Nothing is displayed on the display section 7 in this state. However, when the interchangeable lens 3 is mounted, as shown in FIG. 3B, the display control section 6b displays a sample image 41a that shows that the interchangeable lens 3 is a photographic lens on the display section 7.

In this case, the (display control section 6b of the) signal processing and control section 6 reads out the sample image 41a as image data that is recorded in the memory 22 inside the interchangeable lens 3, and displays the sample image 41a as a first display mode. According to the example in FIG. 3B, information to the effect that the sample image 41a was photographed when the distance to the subject was 2 meters is also displayed.

Figure 4A:
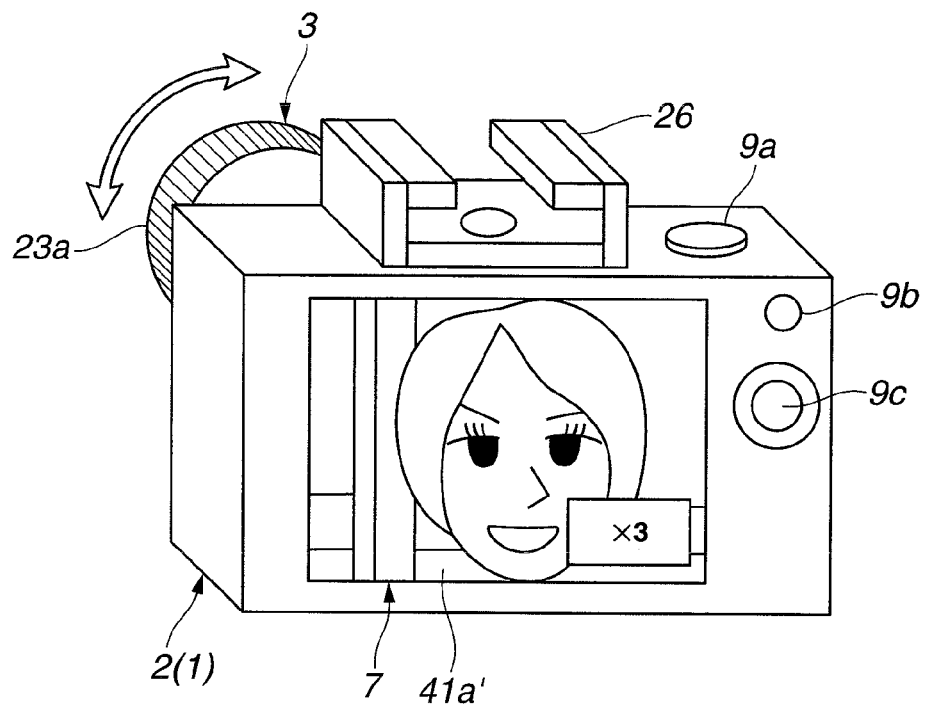
FIG. 4A is a view in which a sample image that is enlarged by a zoom operation is displayed according to an embodiment of the present invention.

Further, display control section 6b has a control function that, when the operation section 23 of the interchangeable lens 3 is operated, displays a sample image corresponding to the function of the operation section 23 on the display section 7. More specifically, when a zoom operation section (for example, a zoom ring) 23a is operated as shown in FIG. 4A, a sample image shows to what extent zoom magnification or the like can be performed by the interchangeable lens 3 in accordance with the operation. That is, when the interchangeable lens 3 is mounted to the camera main body 2, an image that corresponds to a photographing condition, in this case, a zoom amount, that corresponds to the operation with respect to the interchangeable lens 3 is displayed on the display section 7.

More specifically, if a camera operation is performed at a time when a sample image is displayed (S16 in FIG. 10 and the like), an image that corresponds to the operation with respect to the interchangeable lens 3 is displayed on the display section 7. For example, an image that depends on an image magnification ratio that is determined by a zoom operation amount is displayed.

According to the specific example shown in FIG. 4A, based on the display of the sample image 41a, the user 10 can easily know what kind of magnification is possible by reading out and displaying, for example, a sample image 41*a*' obtained by magnifying the sample image 41*a* threefold. In FIG. 4A, a display with the character and numeral "×3" that indicates a zoom operation to magnify an image threefold is superimposed on the sample image as photographing condition information on the display section 7 by the display control section 6*b*.

As a result, the user can perceive the appearance of an image that can be magnified with the lens, and can use the sample image as a reference at the time of photographing. If there is no sample image that matches an image that the user has in mind, the user can make a decision in advance, such as select a different interchangeable lens, to thereby avoid wasting time in changing the lens after the user goes to the photographing location. Thus, the user can perform photographing without missing a photographing opportunity.

Figure 4B:
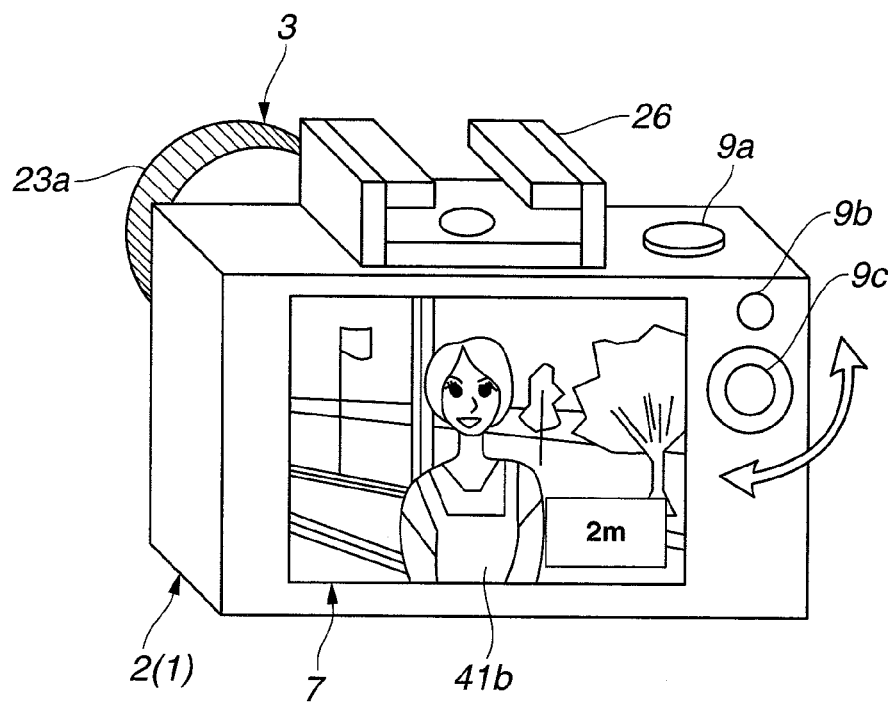
FIG. 4B is a view that illustrates a state in which a sample image that corresponds to a diaphragm operation is displayed by a diaphragm operation according to an embodiment of the present invention.

Although an example of display control with respect to operations on the interchangeable lens 3 side is illustrated in FIG. 4A, a configuration may also be adopted in which similar display control is performed with respect to operations on the camera main body 2 side. For example, FIG. 4B illustrates the manner in which the user 10 performs a diaphragm operation by operating the dial button 9*c*.

According to this specific example, in response to a diaphragm operation that changes a diaphragm value, the display control section 6*b* performs control so as to read out, for example, a corresponding sample image 41*b* that was photographed when the diaphragm value was 2.0, and display the sample image 41*b*. In this case, a configuration may be adopted in which the display control section 6*b* displays characters showing the diaphragm value as photographing condition information in a superimposed manner on the display section 7.

Thus, the user can perceive the appearance (the depth of field such as the manner in which the background is blurred, or the like) of an image that can be photographed using the diaphragm control of the lens, and can use this as a reference at the time of photographing. If there is no image with a gradation effect that matches the effect that the user has in mind, the user can make a decision in advance, such as select a different interchangeable lens, to thereby avoid wasting time in changing the lens after the user goes to the photographing location. Thus, the user can perform photographing without missing a photographing opportunity.

The user 10 can readily understand from the display of the sample image 41*b* the appearance of the sample image 41*b* under a photographing condition in which only a vicinity of a range at which the lens is focused in the sample image 41*a* is clear while the distant background is blurred.

Figure 5A:
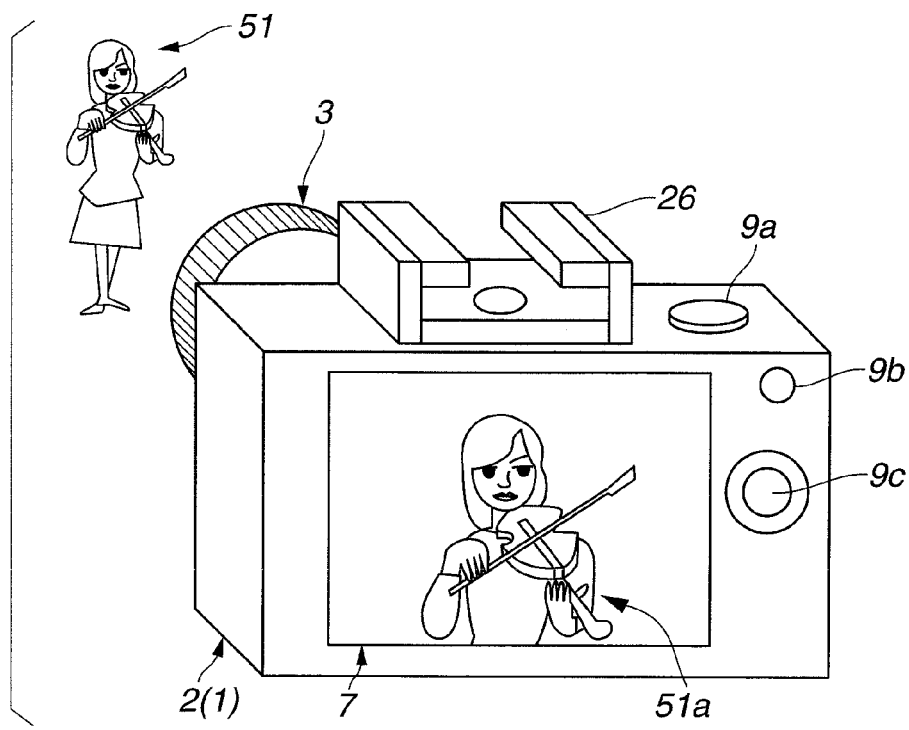
FIG. 5A is a view that illustrates a manner in which an image of a subject is displayed on the display section in a state before mounting an electronic viewfinder to a camera main body according to an embodiment of the present invention.

According to the present embodiment it is also possible to perform display control in conjunction with the accessory apparatus 4. FIG. 5A illustrates the manner of display control by the display control section 6*b* at the time of photographing a subject in a state in which the accessory apparatus 4 is not mounted to the camera main body 2.

In this state, the display control section 6*b* displays a picked-up image 51*a* in which an image of a human subject 51 is being picked up through the interchangeable lens 3 and the image pickup device 5*a* of the image pickup section 5 on the display section 7 of the rear surface of the camera main body 2 (in the second display mode).

Figure 5B:
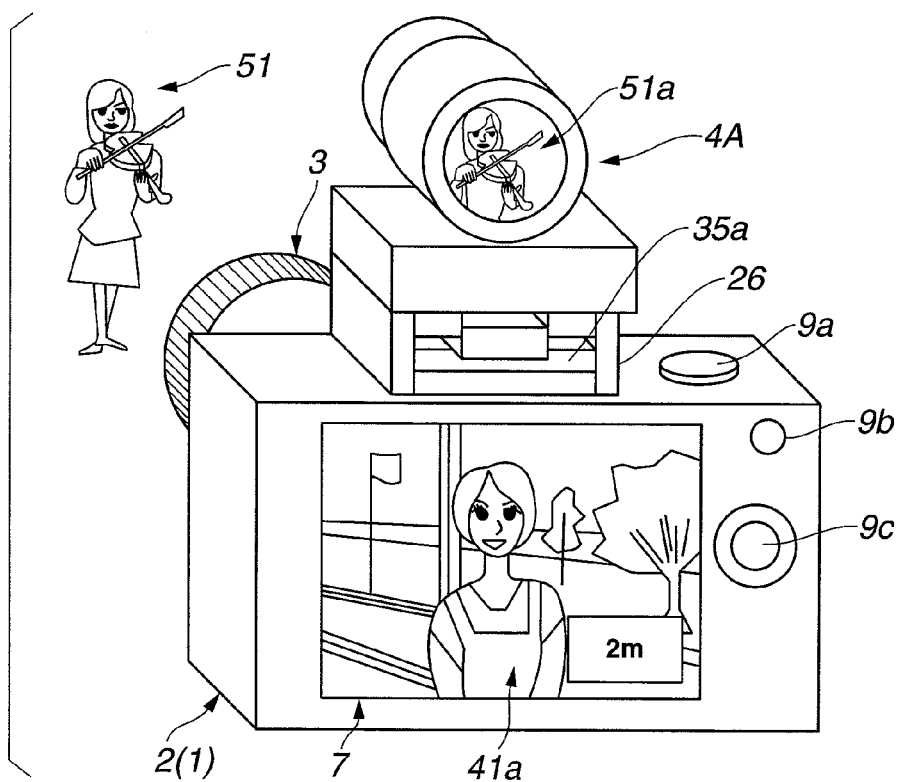
FIG. 5B is a view that illustrates a manner in which a sample image is displayed on the display section in a state after an electronic viewfinder is mounted to a camera main body according to an embodiment of the present invention.

When, for example, the EVF 4A is mounted from the state in FIG. 5A, as shown in FIG. 5B the picked-up image 51*a* is displayed on the viewfinder display section of the EVF 4A. Consequently, the necessity to display the same picked-up image 51*a* on the display section 7 of the rear surface of the camera main body 2 decreases.

Therefore, according to the present embodiment, when the EVF 4A is mounted, it is also possible to stop the function that displays a subject on the display section 7 of the rear surface of the camera main body 2 and, instead, display the sample image 41*a*. That is, the display control section 6*b* may be configured to perform display control that changes the display contents that are displayed on the display section 7 in accordance with a function of the accessory apparatus 4 (specifically, a viewfinder function).

Note that, as described later in FIG. 12, a configuration may also be adopted in which, in a case where a viewfinder such as the EVF 4A is not mounted also, display control is performed to display the picked-up image 51*a* after displaying a sample image for a short time.

The user 10 can perform photographing using the sample image 41*a* that is displayed on the display section 7 as a model at the time of photographing.

Although FIG. 5B illustrates an example in which one sample image 41*a* is displayed, a configuration may be adopted so as to analyze and obtain a feature value of an image that the user is attempting to photograph and display a plurality of sample images that have a feature value that matches or is similar to the feature value in question.

Figure 6:
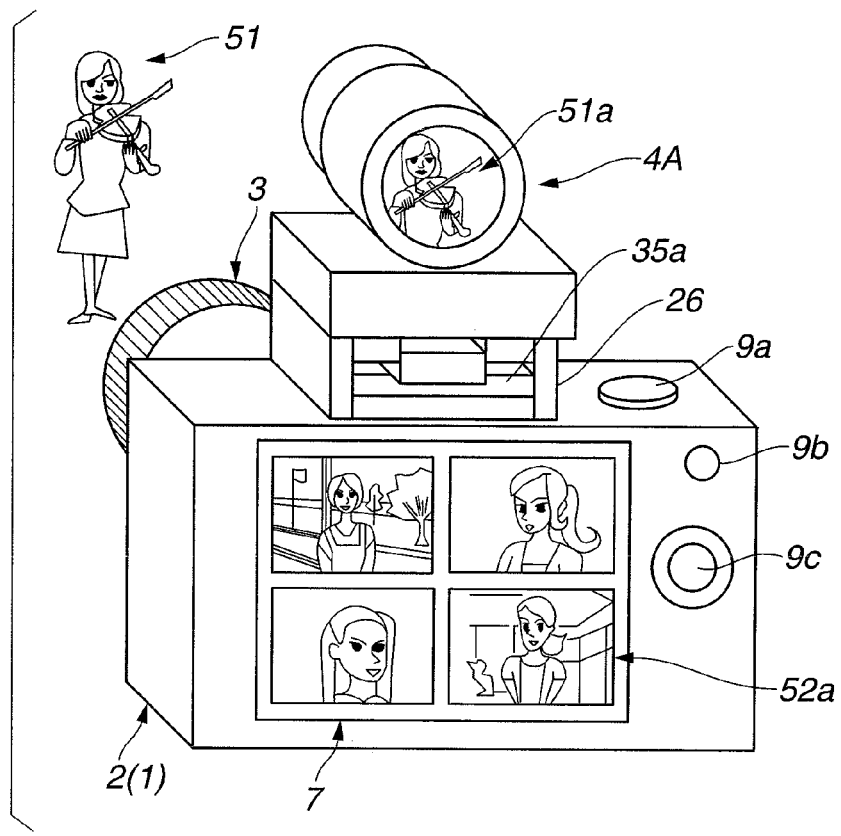
FIG. 6 is a view that illustrates a manner in which a plurality of sample images are displayed on the display section according to an embodiment of the present invention.

For example, a configuration may be adopted in which a face in a photographic image the user is attempting to photograph is detected by the face detection section 15, a plurality of sample images that are similar to the photographic image are selected according to the detection result, and the plurality of sample images 52*a* that are selected are displayed as shown in FIG. 6.

Since it is possible to prevent the display of unrequired sample images by displaying sample images in this manner, the convenience of the user 10 can be improved. Further, a configuration may also be adopted according to the present embodiment in which the user 10 can add photographic images that the user 10 photographed to the sample images as sample images to be displayed in this manner.

Figure 7A:
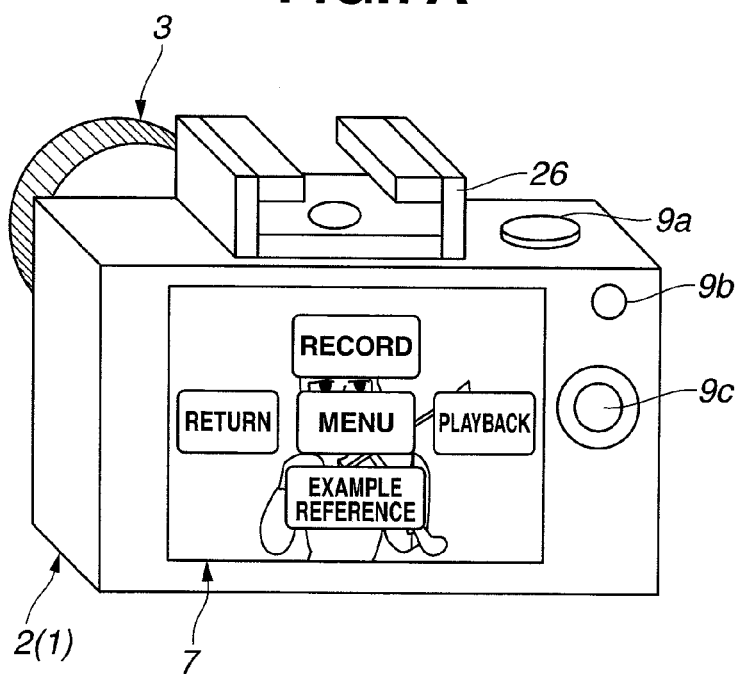
FIG. 7A is a view that illustrates a manner in which a menu screen that enables selection of operations such as an example reference is displayed on the display section by operation of a menu switch when in a photographing mode according to an embodiment of the present invention.

As shown in FIG. 7A, a configuration may also be adopted that, for example, allows a user to perform an operation relating to an example such as the display of a sample image by means of a menu operation, for example, at the time of photographing (when in the photographing mode) when the interchangeable lens 3 is mounted.

According to the present embodiment, a configuration is adopted that allows the user 10 to operate the menu switch 9*b* or the like to display menu items such as an "example reference" as a menu screen on the display section 7 as shown in FIG. 7A. According to FIG. 7A, in addition to an "example reference" item, a "playback" item, a "record" item, and a "return" item are displayed.

The user 10 uses the menu switch 9*b*, the dial button 9, a touch panel 9*d* or cross keys or the like to make a selection or decision with respect to a plurality of items on the menu screen. Note that the present invention is not limited to the display example shown in FIG. 7A, and any configuration may be adopted that allows an operation to be performed that switches between a first display mode that displays at least a sample image and a second display mode that displays a picked-up image.

A configuration may also be adopted that switches between a first display mode and a second display mode that displays a picked-up image by a previously set control method on the camera main body 2 side.

Further, a configuration may be adopted that allows an operation relating to an example to be performed in a similar manner at a time of playback (when in the playback mode) that plays back an image.

Figure 7B:
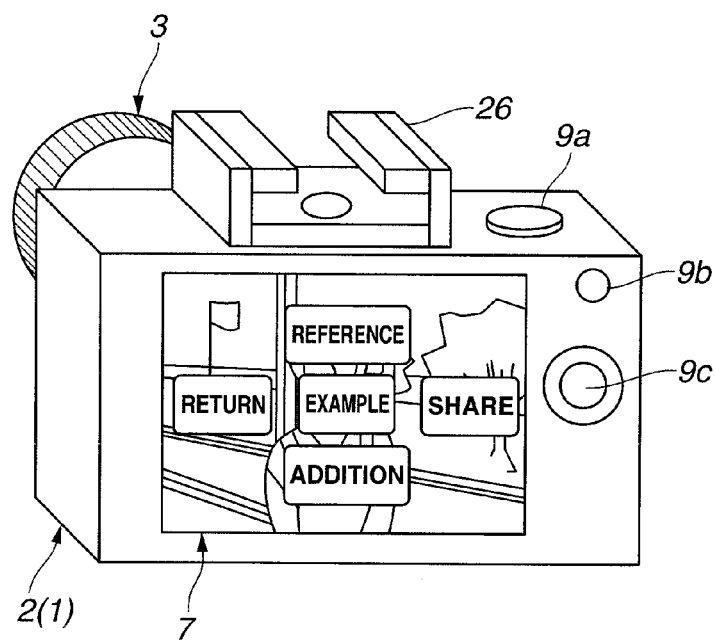
FIG. 7B is a view that illustrates a manner in which an "example" item is selected from a menu screen when in a playback mode to enable selection of an operation such as an example reference or addition according to an embodiment of the present invention.

According to a specific example illustrated in FIG. 7B, a display example is shown for a case in which the menu switch 9b is operated at a time of playback, and the "example" item is further selected from the display of menu items. In this case, an "addition" item that adds a (specific example of a) sample image as an example, a "reference" item that refers to a sample image, a "share" item that makes it possible to share a sample image with another user, and an item that performs a return operation that cancels the display of the current menu are displayed.

According to the present embodiment, the addition function adds a sample image while ensuring security. In contrast, the share function is configured to allow sharing of sample images without ensuring the security thereof.

Note that the present invention is not limited to the display example of the menu screen that is shown in FIG. 7B in the playback mode, and any configuration may be adopted that allows an operation to be performed that switches between a first display mode that displays a sample image and a second display mode that displays a picked-up image.

When a share operation is performed with respect to the display example shown in FIG. 7B, for example, a photographic image that is being played back at a time of playback is recorded in an area other than the security area 22a in the memory 22 of the interchangeable lens 3.

Accordingly, by mounting the interchangeable lens 3 to a separate camera main body (a camera main body 2' that is a separate body that is different from the camera main body 2), the photographic image that has been recorded by the share operation can be referred to as a sample image on the camera main body 2' that is a separate body and recorded in the camera main body 2'. A specific example in this case is illustrated in FIG. 8.

Figure 8:
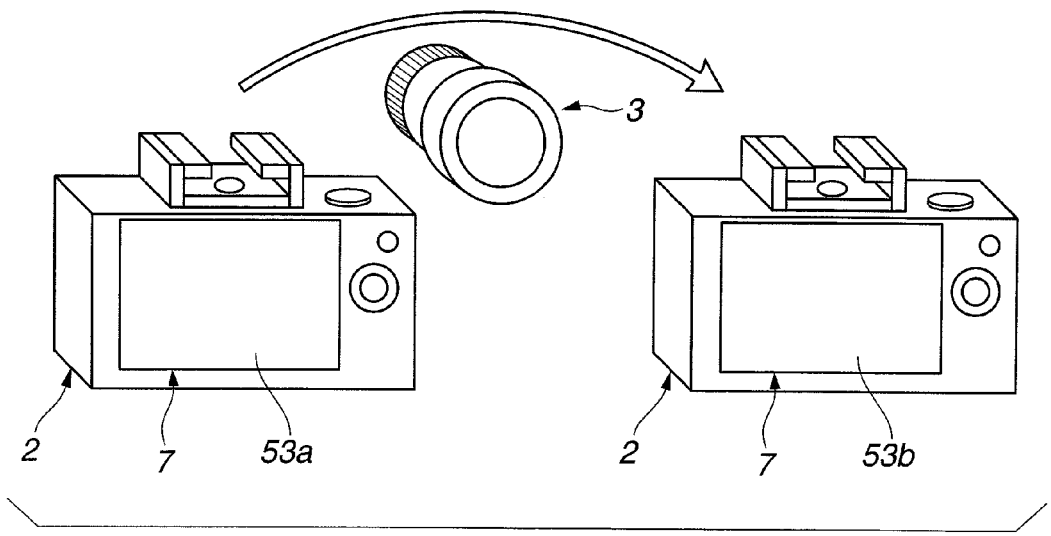
FIG. 8 is an explanatory drawing that illustrates a state in which an interchangeable lens is detached from one camera main body and the interchangeable lens is mounted to another camera main body to enable acquisition of a sample image that is recorded in the interchangeable lens according to an embodiment of the present invention.

A teacher in a photography class uses the camera main body 2 shown on the left side in FIG. 8 to photograph an image and performs an operation to share the image to thereby record a sample image 53a in the memory 22 of the interchangeable lens 3. The teacher then detaches the interchangeable lens 3 from the camera main body 2 and mounts the interchangeable lens 3 to the camera main body 2' of a student.

Subsequently, by performing an operation to display a sample image, the student can view the sample image (denoted by reference numeral 53a in FIG. 8) photographed by the teacher as a sample image (denoted by reference numeral 53b in FIG. 8) as a model (example) for photographing that is displayed on the display section 7. Further, the student can perform a recording operation to copy and record the sample image 53b that is being displayed in the recording section 8 of the camera main body 2'. That is, a sample image can also be transferred.

However, since a case may also arise in which the user does not wish to share all sample images and photographing conditions thereof that are recorded in the memory 22 inside the interchangeable lens 3, according to the present embodiment a configuration is adopted that enables the user to record sample images and photographing conditions that the user does not wish to share in the security area 22a with respect to which security is ensured.

Figure 9:
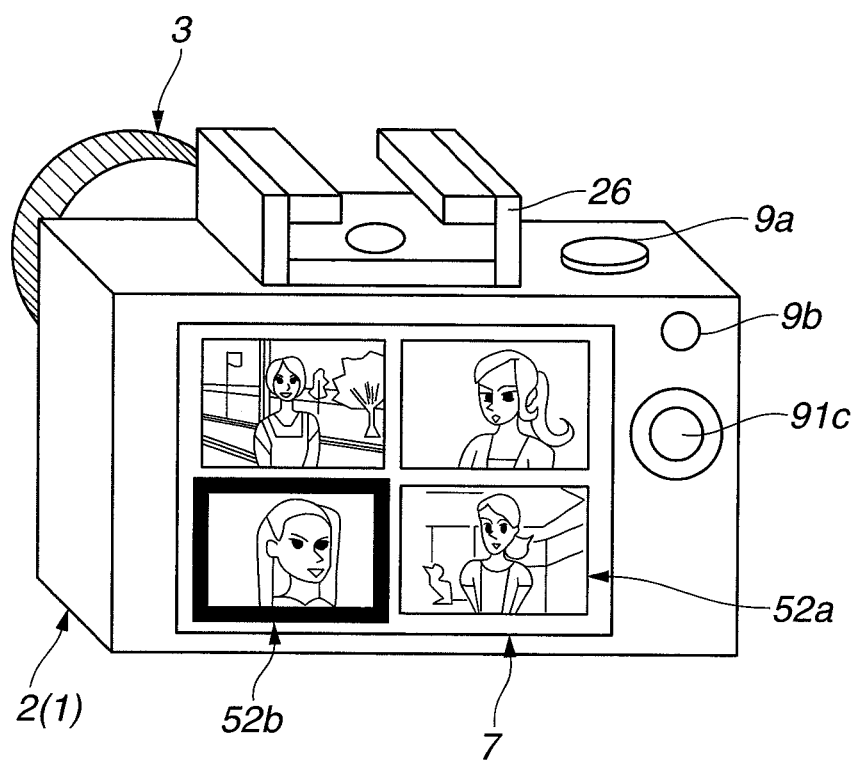
FIG. 9 is an explanatory drawing of a manner in which, by mounting of the interchangeable lens as shown in FIG. 8, photographing conditions are acquired based on recorded sample images.

Further, a configuration may be adopted so that, in a case where a plurality of sample images 52a are displayed on the display section 7 as shown in FIG. 9 and the user 10 selects a sample image 52b that is similar to an image the user is actually attempting to photograph, the user can acquire information regarding the photographing conditions such as the diaphragm and shutter speed when the selected sample image 52b was photographed, and set that information as the photographing conditions for the current photographing operation.

Note that, in FIG. 9, the sample image 52b is shown with a thick frame.

The camera 1 of the first embodiment that is described above constitutes a photographing apparatus to which the detachable interchangeable lens 3 is selectively mounted to perform photographing, and which includes: the image pickup section 5 that includes the image pickup device 5a that is disposed at an image forming position of the interchangeable lens; the memory 22 as a recording section that is provided in the interchangeable lens 3 and that records image data that includes an image; the display section 7 that displays an image; and the display control section 6b that performs display control that can switch between a first display mode in which an image recorded in the memory 22 inside the interchangeable lens 3 is read out and displayed on the display section 7 and a second display mode in which an image that is being picked up by the image pickup section 5 through the interchangeable lens 3 is displayed on the display section 7.

The contents of control by the camera 1 of the first embodiment as described above are illustrated in FIG. 10. When the power of the camera 1 is turned on, the signal processing and control section 6 reads out a control program that is recorded, for example, in a control program storing section 8b of the recording section 8, and starts control operations in accordance with the control program. Note that the control program may be recorded in a recording section other than the recording section 8.

Figure 10:
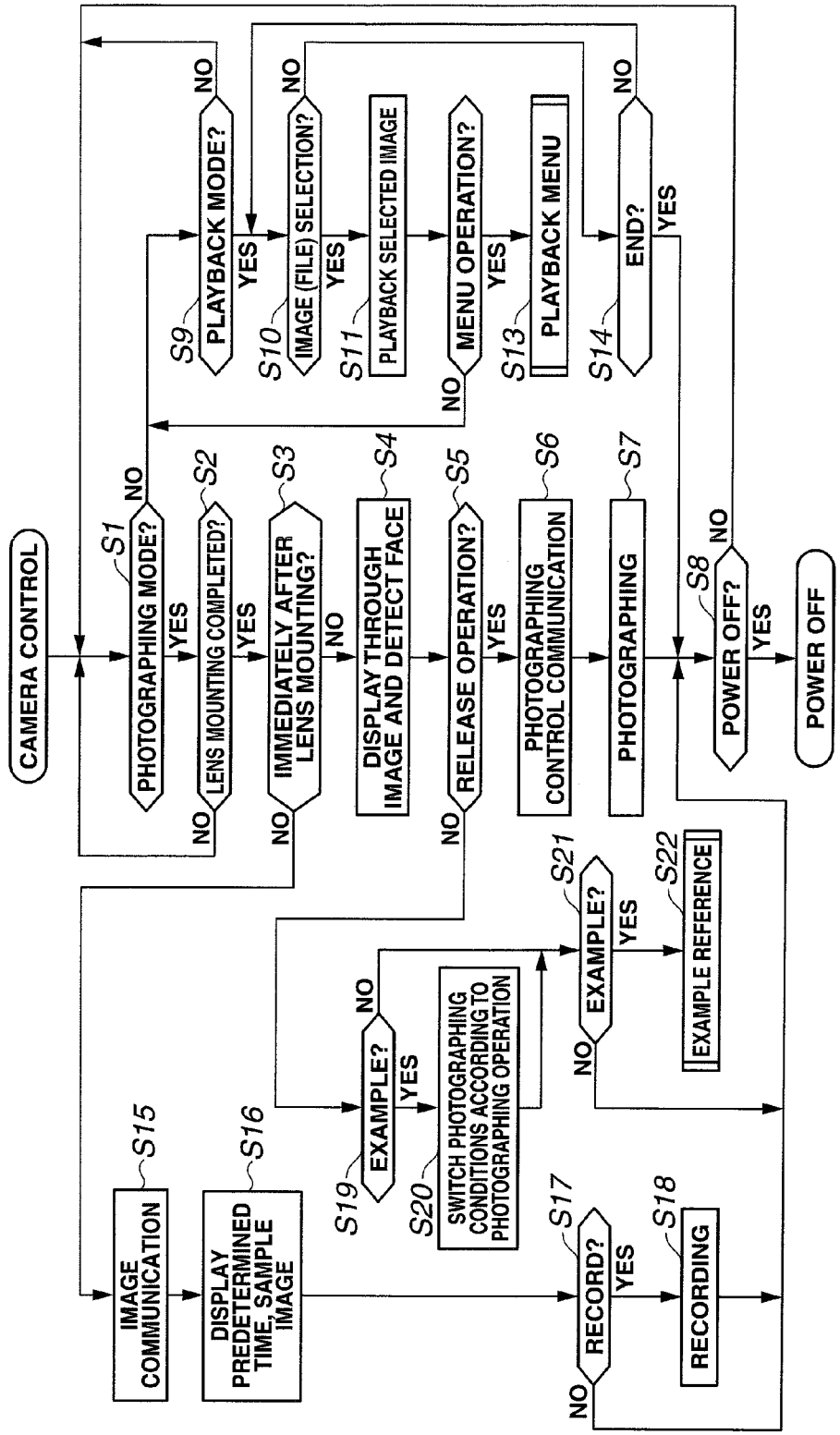
FIG. 10 is a flowchart that illustrates a representative example of processing procedures when performing photographing control according to a camera of an embodiment of the present invention.

Processing procedures of camera control for implementing the above described contents are illustrated in FIG. 10 with reference to FIG. 1 to FIG. 9.

As shown in FIG. 10, when the camera control operation starts, in the initial step S1, the signal processing and control section 6 determines whether or not the camera 1 is in the photographing mode.

If the photographing mode is selected, in step S2 the signal processing and control section 6 determines whether or not mounting of the interchangeable lens 3 that is being mounted to the camera main body 2 is completed. If the result determined in step S2 is that lens mounting is not completed, the operation returns to the processing in step S1.

If lens mounting is completed, next, in step S3, the signal processing and control section 6 determines whether or not the current state is immediately after performing lens mounting in which the interchangeable lens 3 has been mounted.

If the determined result is that the current state is not immediately after performing lens mounting, next, in step S4, the signal processing and control section 6 displays a picked-up image that is picked up by the image pickup section 5 as a through image on the display section 7 and also performs face detection by means of the face detection section 15 based on the picked-up image. In other words, immediately after a lens is mounted, the (display control section 6b of the) signal processing and control section 6 performs control that displays a sample image for a predetermined time as described later in step S16, and thereafter switches the display to display a picked-up image.

Next, in step S5, the signal processing and control section 6 determines whether or not the user 10 has performed a release operation to perform photographing.

If a release operation has been performed, in step S6 the signal processing and control section 6 performs diaphragm value control and photographing control with respect to the focusing and shutter speed of the lens section 21 using the interchangeable lens 3, using a photographing control communication function that is realized by means of the communication section 12 and the communication section 24 of the interchangeable lens 3. The contents of this action are described later referring to FIG. 13.

A picked-up image that is picked-up by the image pickup section 5 through the interchangeable lens 3 by the photographing control in step S6 is subjected to processing for photographing and recording the picked-up image as a photographic image by the signal processing and control section 6 in step S7. The signal processing and control section 6 performs compression processing with respect to the picked-up image and records the image that has undergone compression processing in the recording section 8 as a photographic image.

In this case, the signal processing and control section 6 records the features of the image in the image feature recording section 8a. The signal processing and control section 6 also records information regarding the photographing conditions at the time of photographing in the recording section 8. When recording the relevant image as a sample image in the memory 22 of the interchangeable lens 3, this information regarding the photographing conditions is recorded as image data that is associated with the sample image.

Next, in step S8, the signal processing and control section 6 determines whether or not an operation to turn off the power has been performed. If an operation to turn off the power has been performed, the signal processing and control section 6 turns the power off.

If the result determined by the processing in step S1 is that the camera 1 is not in the photographing mode, in step S9 the signal processing and control section 6 determines whether or not the camera 1 is in the playback mode with respect to which playback of a photographic image recorded in the recording section 8 is selected.

If the playback mode is not selected the processing returns to the processing in step S1. In contrast, if the result determined in step S9 is that the playback mode has been selected, a plurality of thumbnail images that are reduced images that can be played back are displayed on the display section 7.

Note that a configuration may be adopted in which a plurality of images are divided into files (or folders) and the most recent image of each file is displayed, respectively. Next, in step S10, the signal processing and control section 6 determines whether or not an operation has been performed to select an image to be played back.

If selection of an image has not been performed, in step S14 the signal processing and control section 6 determines whether or not to end the processing. Conversely, if selection of an image has been performed, in step S11, the signal processing and control section 6 enlarges the selected thumbnail image and plays back and displays the image in a normal size on the display section 7.

Next, in step S12, the signal processing and control section 6 determines whether or not the user 10 has performed a menu operation. If a menu operation has not been performed, the processing returns to the processing in step S9. In contrast, if it is determined that a menu operation has been performed, in step S13, the signal processing and control section 6 displays a playback menu or the like as shown in FIG. 7B as a menu relating to an example in the playback mode, and performs processing with respect to the playback menu.

In this connection, a configuration may also be adopted in which the menu relating to the example that is shown in FIG. 7B is displayed as a playback menu in a case where, after displaying a "playback" item that corresponds to the normal playback mode and an "example" item that relates to the example, an operation that selects the "example" item is performed. The processing of this playback menu is described later referring to FIG. 11. In this connection, although the display example in FIG. 7B illustrates a case in which a menu including an item for referring to an example and the like is displayed over the display of the sample image, a configuration may also be adopted in which a menu of this kind is displayed over a playback image of a picked-up image or a photographic image that the user is currently attempting to photograph.

If an operation to end the processing has not been performed in step S14, the processing returns to step S10. In contrast, if an operation to end the processing has been performed, the processing moves to step S8.

If it is determined in the aforementioned step S3 that the current state is immediately after mounting a lens, in step S15 the signal processing and control section 6 performs image communication processing by means of the communication section 12 and the communication section 24 of the interchangeable lens 3.

In the image communication processing, the camera main body 2 acquires information (lens information) of image data in the memory 22 inside the interchangeable lens 3, reads out image data (including a sample image) in accordance with the information that is acquired as a result, and temporarily records the image data that has been read out inside the camera main body 2 (to enable display thereof on the display section 7). The processing in this step S15 will be described later referring to FIG. 14.

Next, in step S16, the display control section 6b of the signal processing and control section 6 displays a sample image acquired by means of the image communication function on the display section 7 for a predetermined time.

Subsequently, in step S17, the signal processing and control section 6 determines whether or not an operation to record the sample image from the interchangeable lens 3 has been performed. The user 10 can perform such a recording operation by performing an operation with respect to a displayed "record" item from the menu screen by means of the menu switch 9b as shown in FIG. 7A.

If an operation to record the sample image has been performed, next, in step S18, the signal processing and control section 6 records the sample image in the recording section 8, and thereafter the processing moves to step S8. In contrast, if the result determined in step S17 is that a sample image is not to be acquired, the processing moves to step S8.

Further, if it is determined that a release operation is not performed in the aforementioned step S5, in step S19 the signal processing and control section 6 determines whether or not an operation has been performed by means of the operation section 9 or 23.

If an operation has been performed, next, in step S20, the signal processing and control section 6 performs processing that switches the photographing conditions in accordance with the operation. More specifically, when the user 10 performs an operation to set a photographing condition such as the zoom mechanism, the diaphragm, or the shutter speed for photographing, the signal processing and control section 6 switches the settings of the photographing conditions of the camera 1 in accordance with the relevant operation. In the case of performing the processing from step S19 to step S20 also, communication for photographing control is performed between the (signal processing and control section 6 of the) camera main body 2 and the interchangeable lens 3 in a similar manner to step S6.

After the processing in step S20, or if an operation has not been performed in step S19, the processing advances to the processing in step S21. In step S21, the signal processing and control section 6 determines whether or not an operation to refer to an example has been performed. If an operation to refer to an example has not been performed, the processing moves to step S8.

If an operation to refer to an example has been performed, in step S22 the signal processing and control section 6 performs example reference processing. The example reference processing is described later referring to FIG. 12.

Figure 11:
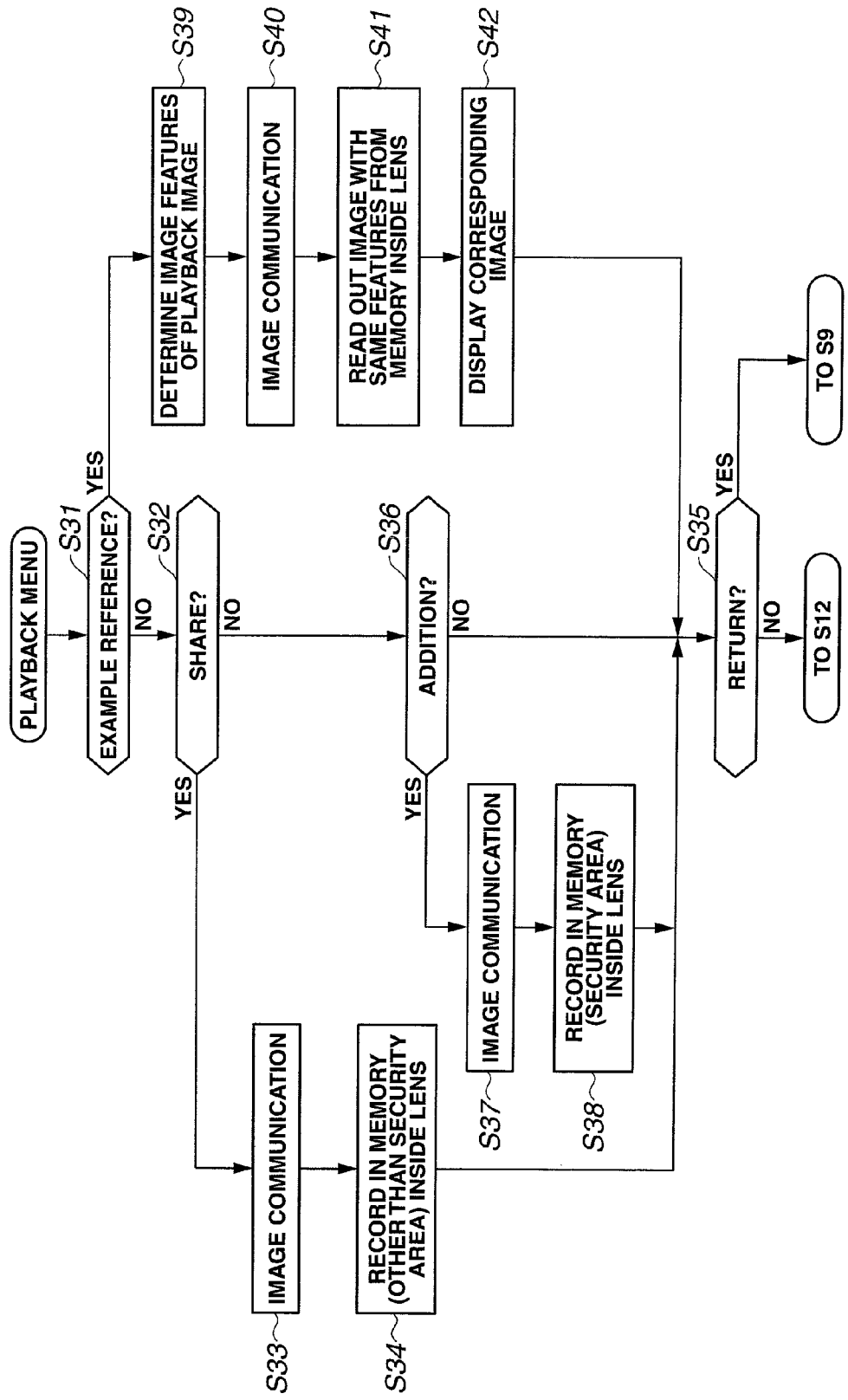
FIG. 11 is a flowchart that illustrates a representative example of processing of a playback menu shown in FIG. 10.

Next, the playback menu will be described with reference to FIG. 11. With respect to the playback menu, the functions of a normal playback mode for playing back a photographic image recorded in the recording section 8 further include a function that can add (that is, record the relevant image in the memory 22 of the interchangeable lens 3) a playback image, which is a photographic image played back, as a sample image as an example, and a function that can refer to a sample image (in the memory 22 of the interchangeable lens 3).

When processing of the playback menu starts, in the initial step S31 the signal processing and control section 6 determines whether or not the user 10 has performed an operation to select to refer to an example.

If the user 10 has not performed an operation to select to refer to an example, next, in step S32, the signal processing and control section 6 determines whether or not the user 10 has performed an operation in which the user 10 selects to share an image. The user 10 performs a share operation if the user 10 decides that a playback image that is being played back may be viewed by another user or transferred to another user.

If the user 10 has performed an operation in which the user 10 selects to share, next, in step S33, the signal processing and control section 6 performs image communication processing by means of the communication section 12 and the communication section 24 of the interchangeable lens 3. At this time, the signal processing and control section 6 reduces the size of the image to a size that appears normal to the user when the image is displayed on the display section 7 to thereby enable high-speed communication of the image data. For example, the signal processing and control section 6 resizes the image to a VGA level in accordance with the number of pixels of the display section 7 on the rear surface.

Subsequently, in step S34, image data of the playback image that is being displayed on the display section 7 on the camera main body 2 side is sent to the interchangeable lens 3 side from the camera main body 2 by image communication processing, and is recorded in a normal area that is other than the security area 22a of the memory 22 inside the interchangeable lens 3. After step S34, the processing moves to step S35.

If a "share" operation has not been performed in step S32, in step S36 the signal processing and control section 6 determines whether or not an addition operation has been performed to add and record a sample image for which security is ensured in the memory 22. If an addition operation has not been performed, the processing moves to step S35, while if an addition operation has been performed the processing moves to step S37.

In step S37, the signal processing and control section 6 performs image communication processing by means of the communication section 12 and the communication section 24 of the interchangeable lens 3. The signal processing and control section 6 sends image data of the playback image that is being played back on the display section 7 to the interchangeable lens 3 side. Subsequently, in step S38, the image data of the playback image that is sent is recorded in the security area 22a of the memory 22 inside the interchangeable lens 3. After step S38, the processing moves to the processing of step S35.

In step S38, the signal processing and control section 6 reduces the size of the image to a size that appears normal to the user when the image is displayed on the display section 7 to thereby enable high-speed communication of the image data. For example, the signal processing and control section 6 resizes the size of the image to a VGA level in accordance with the number of pixels of the display section 7 on the rear surface.

In step S35, the signal processing and control section 6 determines whether or not the user has performed an operation to select "return". If the user has not performed an operation to select "return", the signal processing and control section 6 returns to the processing to determine a menu operation in step S12. In contrast, if the user has performed an operation to select "return", the signal processing and control section 6 cancels the display of the playback menu shown in FIG. 7B and returns to the determination processing with respect to the playback mode in step S9.

Further, if the user 10 has performed an operation to select to refer to an example in step S31, in step S39 the signal processing and control section 6 performs processing to determine an image feature of the playback image. This processing to determine an image feature is performed, for example, as a feature value of a face image, based on a feature value such as the pattern of alignment of characteristic parts or the position of points of intersection of the contours of a face.

For example, by displaying a screen on which a user can select or input a desired feature value on the display section 7 and performing image processing for each sample image to determine whether or not a sample image exists that has a feature value that matches or is similar to the feature value that the user specified using the screen, it is possible to extract an image that has a feature value that matches or is similar to the feature value specified by the user from among a plurality of sample images recorded in the memory 22. Color information may also be utilized as one feature value. In the case of a face, a position and a size of a face pattern within a screen can be determined and a gender, a facial expression, a face orientation, and the like can be also determined by performing a pattern determination operation. In this connection, in the case of scenery or a still-life image or the like, information such as brightness, color distribution and the like can be utilized.

Note that feature values of each sample image may also be previously recorded in the memory 22 of the interchangeable lens 3. In this case, the processing performed in the camera main body 2 to determine an image feature is simplified, and only processing to determine whether a feature value matches or is similar to the specified feature value need be performed in the camera main body 2.

After the processing in step S39, in step S40 the signal processing and control section 6 performs image communication processing by means of the communication section 12 and the communication section 24 of the interchangeable lens 3.

The signal processing and control section 6 reads out a sample image with the same feature as the playback image from the memory 22 inside the interchangeable lens 3 by performing image communication processing. Thereafter, in step S42, the signal processing and control section 6 performs a control action that displays the corresponding image that has been read out, that is, the sample image that has the same feature as the playback image, on the display section 7. Subsequently, the processing moves to the processing of step S35.

Next, the processing for an example reference in step S22 in FIG. 10 will be described by means of FIG. 12. The processing shown in FIG. 12, for example, includes processing that corresponds to the display of menu items as shown in FIG. 7A.

When the example reference processing starts, in the initial step S51 the signal processing and control section 6 determines whether or not a viewfinder such as the EVF 4A shown in FIG. 5A is mounted to the camera main body 2. If a viewfinder is mounted, in step S52 the signal processing and control section 6 performs image communication processing by means of the communication section 12 and the communication section 24 inside the interchangeable lens 3.

Next, in step S53, the signal processing and control section 6 reads out a sample image that is recorded in the memory 22 via the image communication section 24b, and displays the sample image that is read out on the display section 7 of the camera main body 2, for example, for one minute. Thereafter, the signal processing and control section 6 moves to the processing of step S54.

In contrast, if it is determined that a viewfinder is not mounted in step S51, in step S55 the signal processing and control section 6 also performs image communication processing by means of the communication section 12 and the communication section 24 inside the interchangeable lens 3.

Next, in step S56, the signal processing and control section 6 reads out a sample image that is recorded in the memory 22 via the image communication section 24b, and displays the sample image that is read out on the display section 7 of the camera main body 2, for example, for ten seconds. Thereafter, the signal processing and control section 6 moves the processing to the processing of step S54.

Figure 12:
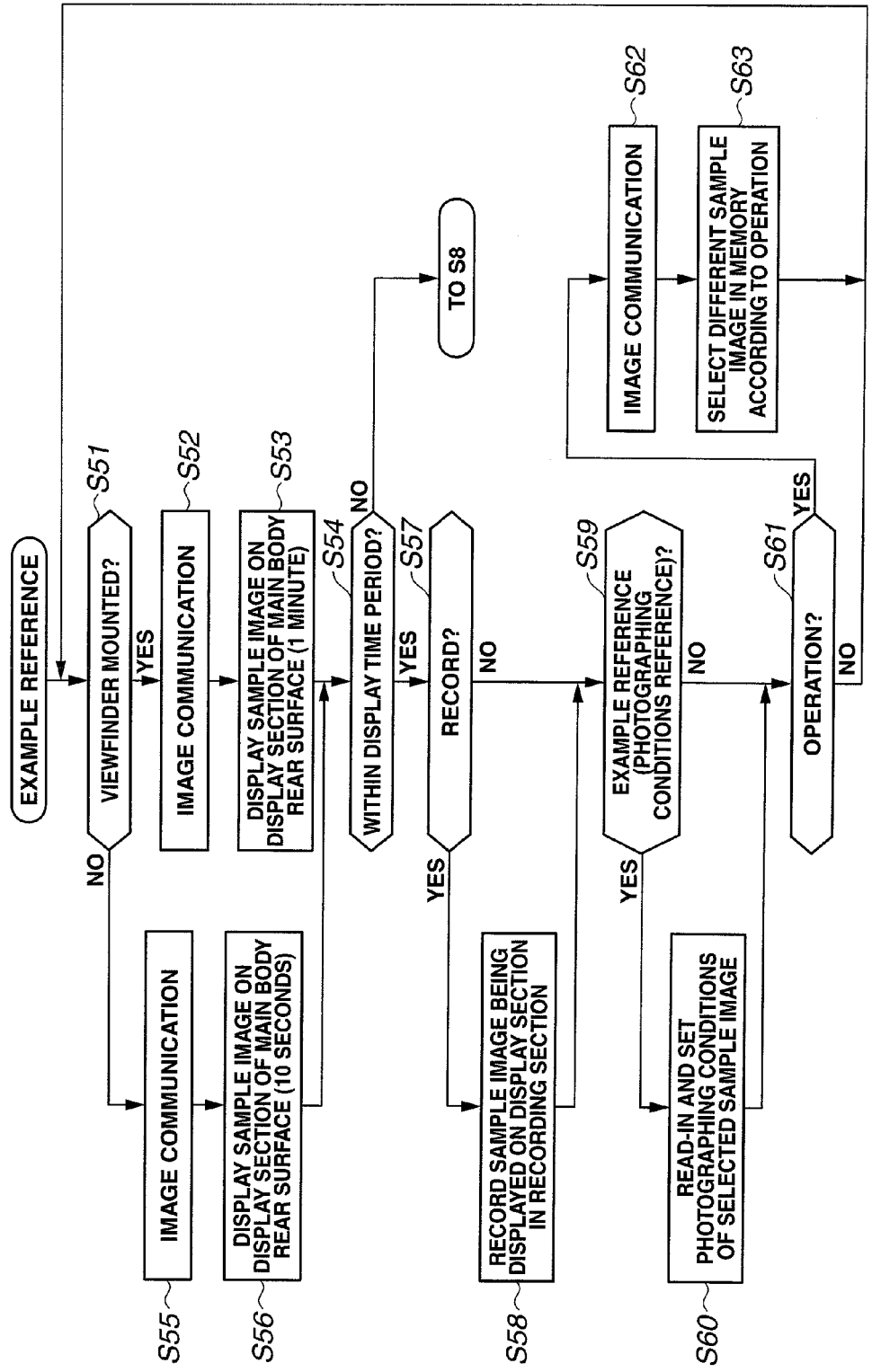
FIG. 12 is a flowchart that illustrates a representative example of processing relating to an example reference shown in FIG. 10.

That is, in the example illustrated in FIG. 12, when a viewfinder is not mounted, the display control section 6b displays a sample image for a short time period, while if a viewfinder is mounted the display control section 6b performs display control that displays the sample image for a longer time period.

The reason is that, when a viewfinder is not mounted it is necessary for the user to use the display section 7 to check an image the user is attempting to photograph, and therefore the time period for which the sample image is displayed is shortened. In contrast, when the viewfinder is mounted, the user 10 can use the viewfinder to check an image the user is attempting to photograph, and therefore the time period for which the sample image is displayed is longer.

In step S54, the signal processing and control section 6 determines whether or not the display time period has elapsed. If the display time period has elapsed, the signal processing and control section 6 ends the processing of FIG. 12 and moves to step S8 of FIG. 10. In this case, a configuration may be adopted in which the signal processing and control section 6 requests the user to decide whether or not to perform "return" processing as shown in FIG. 7A and cancel the menu screen shown in FIG. 7A. In this connection, if the user 10 does not perform an operation to turn off the power when executing the processing in step S8, the operation returns to step S1.

In contrast, if the current state is one in which the display time period has not elapsed when performing the determination processing in step S54, the processing moves to the processing of step S57.

In step S57, the signal processing and control section 6 determines whether or not the user 10 has performed a record operation. For example, if the user 10 has performed an operation with respect to the "record" item as shown in FIG. 7A, in step S58 the signal processing and control section 6 records the sample image that is being displayed on the display section 7 in the recording section 8. Thereafter, the operation moves to the processing of step S59 in the same manner as when a record operation has not been performed.

In step S59, the signal processing and control section 6 determines whether or not the user 10 has performed an example reference (photographing conditions reference) operation as an operation that sets the photographing conditions of an example as the photographing conditions of the camera 1. If an example reference operation has been performed, in step S60 the signal processing and control section 6 reads in the photographing conditions of the selected sample image, and sets the photographing conditions that are read in as the photographing conditions of the camera 1. Thereafter, the processing moves to the processing of step S61 in the same manner as when an example reference operation has not been performed.

In step S61, the signal processing and control section 6 determines whether or not an operation such as a zoom operation or a diaphragm adjustment operation has been performed with respect to the camera 1.

If an operation has been performed, in step S62 the signal processing and control section 6 determines the contents of the operation, and performs image communication processing by means of the communication section 12 and the communication section 24 of the interchangeable lens 3 in accordance with the information of the determined result.

Subsequently, in step S63, the signal processing and control section 6 reads out a different sample image that is recorded in the memory 22 via the image communication section 24b, more specifically, a sample image corresponding to the operation performed in step S62, and displays the sample image that has been read out on the display section 7 of the camera main body 2. Thereafter, the signal processing and control section 6 moves to the processing of step S51 in the same manner as when an operation has not been performed in step S61. Note that the processing of step S63 is not performed if a corresponding different sample image is not recorded in the memory 22. Further, an item for moving to the playback mode may also be provided as shown in FIG. 7A.

Figure 13:
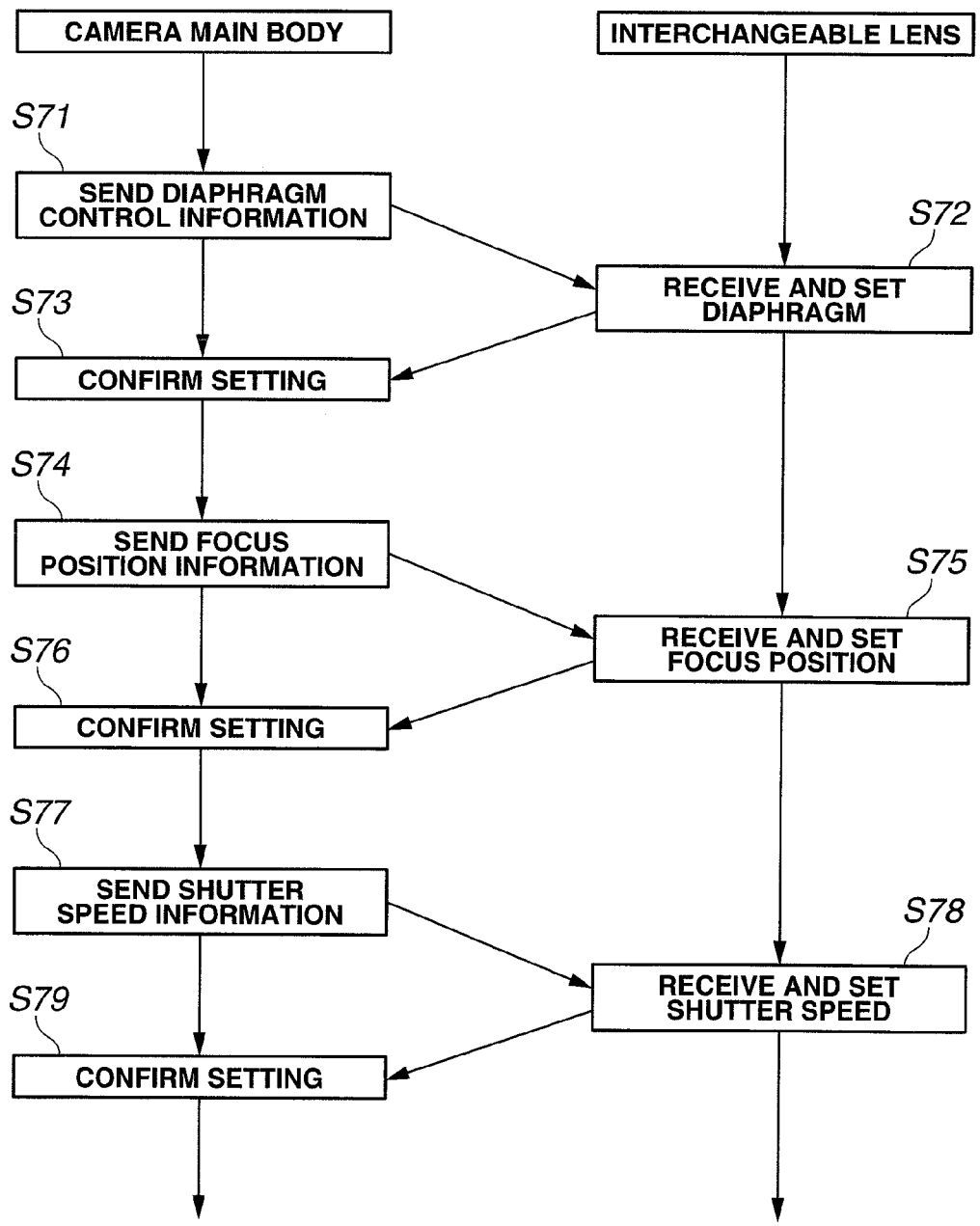
FIG. 13 is an explanatory drawing of operations of communication for photographing control in step S6 in FIG. 10.

The processing for communication for photographing control in step S6 in FIG. 10 will now be described in detail referring to FIG. 13. In this connection, the vertical direction from top to bottom in FIG. 13 (the same applies in FIG. 14 also) indicates the passage of time.

The processing in this case is communication processing between the camera main body 2 and the interchangeable lens 3 in which the camera main body 2 sends diaphragm value information and focus position information of the interchangeable lens 3, and the interchangeable lens 3 sets the lens section 21 to the diaphragm value and focus position that has been sent.

Consequently, as shown in step S71, the camera main body 2 sends diaphragm control information such as the diaphragm value at the time of photographing to the interchangeable lens 3 via the communication section 12 and the communication section 24.

The interchangeable lens 3 receives the diaphragm control information that has been sent as shown in step S72, and sets a diaphragm value in accordance with the received diaphragm control information. After this setting, the interchangeable lens 3 sends a reply to the effect that the setting has been made to the camera main body 2. Next, as shown in step S73, the camera main body 2 confirms the setting by means of the reply.

Further, as shown in step S74, the camera main body 2 sends focus position information to the interchangeable lens 3 via the communication section 12 and the communication section 24.

As shown in step S75, the interchangeable lens 3 receives the focus position information that has been sent, and sets the focus position of the lens section 21 in accordance with the received focus position information. After this setting, the interchangeable lens 3 sends a reply to the effect that the setting has been made. Next, as shown in step S76, the camera main body 2 confirms the setting by means of the reply.

Thereafter, in step S77, the camera main body 2 sends shutter speed information to the interchangeable lens 3. The interchangeable lens 3 sets the shutter speed according to the received shutter speed information, and sends a reply to the effect that the setting has been made (step S78). The camera main body 2 receives the reply to thereby confirm the shutter speed setting (step S79) and end the processing for communication for photographing control.

Figure 14:
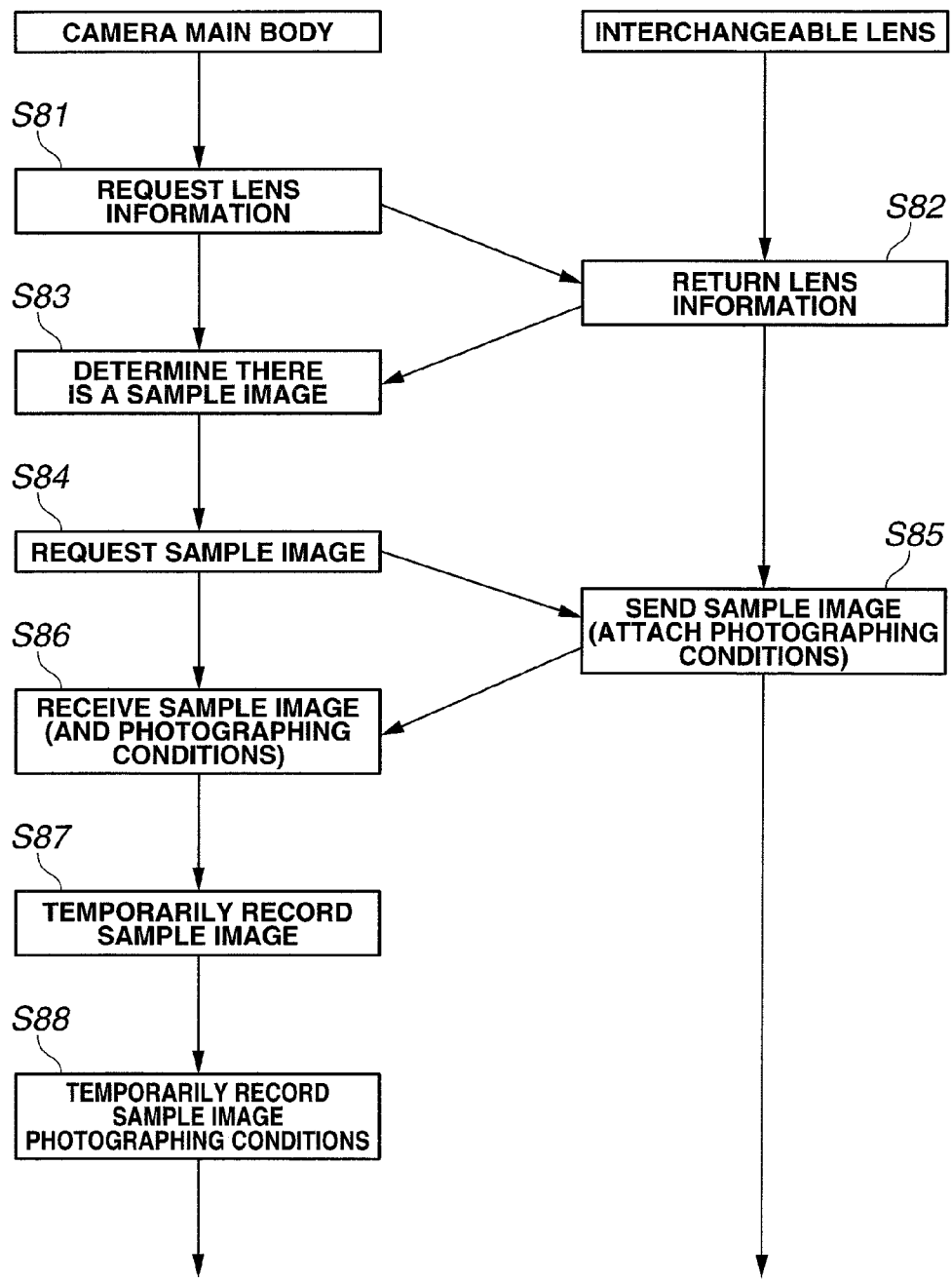
FIG. 14 is an explanatory drawing of operations for image communication in step S15 in FIG. 10.

The image communication processing of step S15 in FIG. 10 will now be described in detail referring to FIG. 14. According to the actional functions in this case, the camera main body 2 sends a signal to the interchangeable lens 3 to confirm whether or not a sample image is recorded in the memory 22 of the interchangeable lens 3.

If a sample image is recorded, processing is performed to read out the sample image and display the sample image that has been read out on the display section 7 of the camera main body 2.

Therefore, as shown in step S81, the camera main body 2 sends a signal requesting lens information to the interchangeable lens 3 (in this case, information regarding whether or not a sample image is recorded in the memory 22 inside the interchangeable lens 3).

In response to this request, as shown in step S82, the interchangeable lens 3 sends a reply (for example, a reply that there is a sample image) with respect to the lens information.

By means of the reply, as shown in step S83, the camera main body 2 determines that there is a sample image in the interchangeable lens 3. Further, as shown in step S84, the camera main body 2 sends a signal requesting (sending of) the sample image to the interchangeable lens 3.

As shown in step S85, the interchangeable lens 3 sends the sample image in response to this request. In this connection, in addition to the sample image, the interchangeable lens 3 also attaches photographing conditions under which the sample image was photographed.

As shown in step S86, the camera main body 2 receives the sample image that is sent. Further, as shown in step S87, the camera main body 2 temporarily records the received sample image in the recording section 8 inside the camera main body 2 or in another recording section or memory.

Further, as shown in step S88, the camera main body 2 also temporarily records the photographing conditions attached to the received sample image inside the camera main body 2. After this processing, in step S16 that follows step S15 in FIG. 10, the temporarily recorded sample image is displayed for a predetermined time on the display section 7.

According to the camera 1 of the present embodiment that has the aforementioned configuration and functions and performs the above described operations, a sample image and photographing conditions of the sample image and the like are recorded in the memory 22 as the recording section for image data in the interchangeable lens 3 that is actually mounted to the camera main body 2.

Accordingly, even when the interchangeable lens 3 is replaced and an interchangeable lens 3 with different characteristics thereto is mounted, in accordance with the interchangeable lens 3 that is actually mounted, a sample image that serves as a model for photographing using the interchangeable lens 3 in question can be easily displayed.

Consequently, according to the present embodiment, by displaying a sample image that serves as a model, it is possible to assist with a photographing operation performed by the user 10 to facilitate the photographing operation. That is, it is possible to improve the convenience of the user with respect to the photographing operation. Further, according to the present embodiment, image data including an image and photographing conditions and the like recorded in the interchangeable lens 3 can also be transferred to another user via the relevant interchangeable lens 3.

In addition, since information regarding the photographing conditions for a sample image of the interchangeable lens 3 that is actually mounted can be read in together with the sample image in question, and the photographing conditions that are read in can be set as the photographing conditions on the camera 1 to perform photographing, the user 10 can easily obtain a favorable photographic image.

Further, when the user 10 performs an operation with respect to the operation section 9 or 23 of the camera 1 so as to change a photographing condition in a state in which the interchangeable lens 3 is mounted, a sample image that serves as a model that corresponds to the operation in question can be read out from the memory 22 of the interchangeable lens 3 and displayed.

Accordingly, the user 10 can easily check the operational functions of the operation sections 9 and 23 and, by means of the displayed sample image, can also easily know an image that can be photographed by the interchangeable lens 3 that is actually mounted when a photographing condition is changed.

The user 10 can also take into account the viewfinder function and control the display mode in accordance with whether the viewfinder is mounted or detached.

Figure 15:
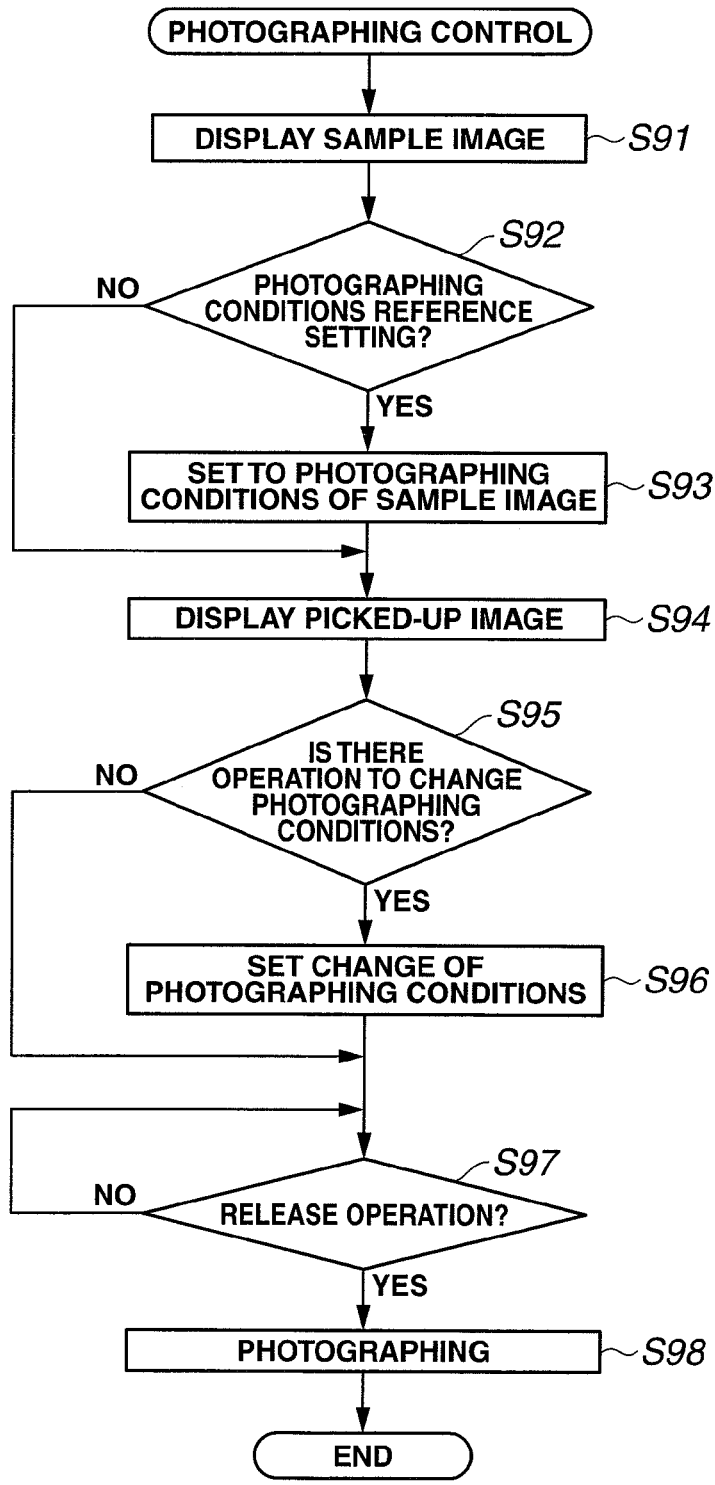
FIG. 15 is a flowchart that illustrates one example of processing procedures of a photographing control method according to an embodiment of the present invention.

A configuration may also be adopted in which, in the above described camera control processing, the signal processing and control section 6 executes a photographing control method according to the processing procedures as illustrated in FIG. 15.

The photographing control method illustrated in FIG. 15 controls photographing by the camera 1 as a photographing apparatus in which the detachable interchangeable lens 3 is mounted to the camera main body 2 as a photographing apparatus main body. This photographing control method has a first display step S91 of performing control that displays a sample image that has been photographed using the mounted interchangeable lens 3 or an interchangeable lens that has the same characteristics as the interchangeable lens 3 that is previously recorded inside the mounted interchangeable lens 3 on the display section 7 of the camera main body 2.

This photographing control method also has a determination step S92 of determining whether or not a setting is made to refer to photographing conditions of the sample image (corresponds to step S59 in FIG. 12) while the sample image is being displayed by the first display step S91. Further, the photographing control method has a setting step S93 of performing control that, when a selection (operation) has been performed to make a setting to refer to the photographing conditions of the sample image, reads out the photographing conditions under which the sample image was photographed and sets the photographing conditions as the photographing conditions of the camera 1. If it is found in the determination step S92 that a reference setting is not selected, and after the processing of the setting step S93, the processing moves to a second display step S94.

The photographing control method also has a second display step S94 of performing control that displays an image that has been actually photographed using the interchangeable lens 3 by means of the display section 7 of the camera main body 2. Further, after the second display step S94, the photographing control method has a step S95 of determining whether or not an operation has been performed to change a photographing condition. If such an operation has been performed, in step S96, processing is performed to change and set a photographing condition in accordance with the operation.

According to the photographing control method, if no operation has been performed in step S95, and after the processing in step S96, the signal processing and control section 6 waits for the user 10 to perform a release operation in step S97, and after the release operation, performs processing to photograph a subject as shown in step S98. Thereafter, the processing of the photographing control method ends.

According to a photographing control method like this, the user 10 displays a sample image that is photographed through an interchangeable lens that is actually mounted as a model photographic image, and if the user 10 wants to perform photographing in the same manner as in the sample image, the user 10 can set the photographing conditions of the camera 1 to the photographing conditions of the sample image.

Further, even when the photographing conditions of the camera 1 have been set to the photographing conditions of a sample image, the user 10 can perform an operation to freely change and set the photographing conditions settings. Thus, by utilizing a sample image that serves as a model, even if the characteristics of the interchangeable lens 3 that is actually mounted change, the user 10 can easily acquire a favorable photographic image in accordance with the changed characteristics.

In this connection, although an example of a representative photographing control method is illustrated in FIG. 15, a method may also be adopted in which, for example, a picked-up image is displayed prior to step S91, and a sample image is displayed in response to an operation for displaying a sample image.

In addition, for example, in step S91, a configuration may be adopted so that instead of displaying a sample image on the display section 7, a sample image and a picked-up image are displayed adjacent to each other at the same time.

As described above, a configuration is adopted in which a photographic image recorded in the recording section 8 of the camera main body 2 can also be added and recorded as an image that serves as a sample image in the memory 22 of the interchangeable lens 3 that is mounted. In this case, the interchangeable lens 3 can be detachably replaced.

Therefore, since it is possible to also record an image as a sample image in the memory 22 of an interchangeable lens 3 that has different characteristics to the interchangeable lens 3 mounted when the image in question was actually photographed, it is favorable to adopt a configuration in which information regarding the interchangeable lens 3 that was used when the relevant image was photographed is also simultaneously recorded with the image to be recorded in the recording section 8 or in each interchangeable lens 3 to thereby facilitate identification of the interchangeable lens 3 that was used for photographing the relevant image.

For example, a configuration may be adopted so as to record code information that differs according to the type and characteristics of the interchangeable lens 3 with respect to a wide-angle lens 3A and a telephoto lens 3B and, in the case of wide-angle lenses 3A of the same kind, to also attach and record therewith code information that further differs according to the characteristics of the respective wide-angle lenses 3A. Naturally, when the characteristics differ, a configuration may be adopted so as to record information regarding the different code information and the like.

Therefore, a configuration may be adopted so that, when the interchangeable lens 3 is mounted and the signal processing and control section 6 of the camera main body 2 displays a sample image from the interchangeable lens 3, the signal processing and control section 6 can use the code information to determine whether or not the interchangeable lens 3 has the same characteristics as an interchangeable lens 4 that was actually mounted when the sample image was photographed.

The display control section 6b of the signal processing and control section 6 then performs display control according to the determined result. For example, under the default settings, the display control section 6b displays only a sample image that corresponds to a case where the determined result is that the characteristics are the same. A configuration may also be adopted so as to perform display control that changes the display control settings so that when it is determined that the characteristics are the same, a message to the effect that photographing is possible with an interchangeable lens that has the same characteristics is displayed together with the sample image, and when it is determined that the characteristics are different, a message to the effect that the sample image was photographed by an interchangeable lens with different characteristics is displayed together with the sample image.

In other words, a configuration may be adopted so that, when reading out and displaying an image recorded in the interchangeable lens 3 that is actually mounted, the display control section 6b performs display control that displays information regarding whether or not the image was photographed with an interchangeable lens that has the same characteristics as the interchangeable lens that is actually mounted.

Figure 16:
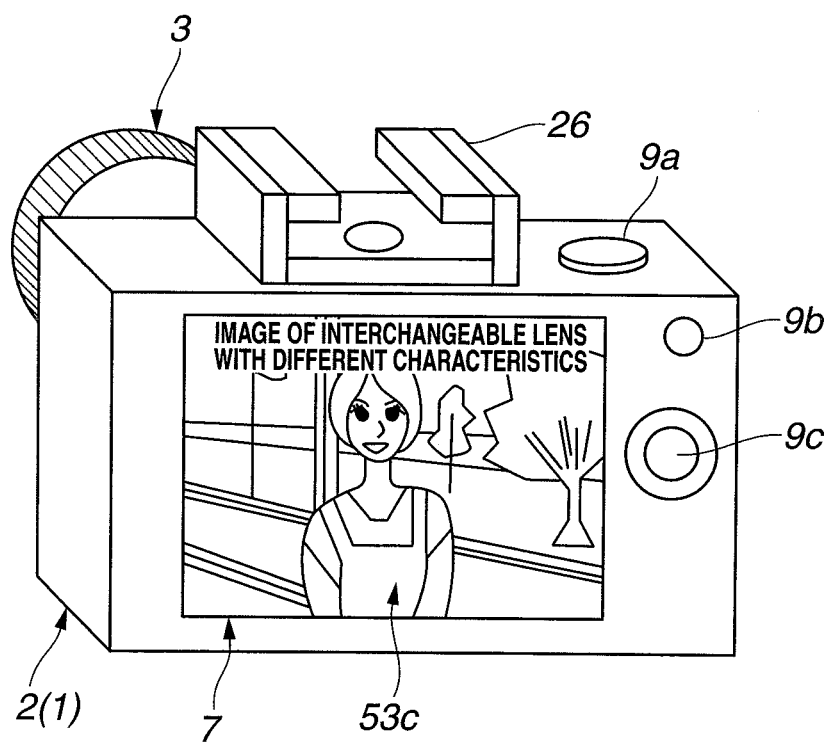
FIG. 16 is a view that illustrates a display example in a case in which a sample image is displayed that has been photographed using an interchangeable lens that has different characteristics from a mounted interchangeable lens according to an embodiment of the present invention.

FIG. 16 shows an example of display control by the display control section 6b in such a case. In this case, for example, a configuration may be adopted such that if an image that was photographed using an interchangeable lens with different characteristics to the characteristics of the interchangeable lens that is actually mounted is recorded in the memory 22 as a sample image, when that sample image 53c is displayed using the display section 7, information to the effect of "image of interchangeable lens with different characteristics" is also displayed.

Further, in the case of an interchangeable lens with different characteristics also, when it is possible to set photographing conditions that are the same as the photographing conditions of the interchangeable lens in question, a configuration may be adopted so that information to the effect that photographing is possible (although the interchangeable lens does not have the same characteristics) is displayed.

Thus, the user 10 can easily confirm whether or not a sample image is an image that can be photographed by the interchangeable lens 3 that is actually mounted. Further, by adopting a configuration such that, when transferring a sample image by means of the interchangeable lens 3 also, the above described information (code information) of the interchangeable lens 3 is simultaneously transferred together with the sample image, the transferred sample image can be effectively utilized.

Note that, with respect to each interchangeable lens 3, a configuration may also be adopted that allows a setting to be made that enables recording of image data including a sample image in a case that approximately corresponds to photographing conditions under which photographing can be performed by the relevant interchangeable lens 3.

Further, a configuration may be adopted so that, in a case where the user 10 has recorded an unintended sample image in the memory 22 of the interchangeable lens 3, the user 10 can check the sample image by displaying the sample image, and erase the sample image from the memory 22.

A configuration may also be adopted in which a folder that records sample images and the like in the case of an interchangeable lens with the same characteristics as the relevant interchangeable lens 3 and a folder that records sample images and the like in the case of an interchangeable lens with characteristics that are different to those of the relevant interchangeable lens 3 are separately provided in the memory 22 of the interchangeable lens 3. Note that the processing procedures shown in FIG. 10 and the like illustrate a representative example, and a part of the processing may be omitted or the processing order may be changed.

Further, in a case where the flash emission apparatus 4B is mounted as shown in FIG. 2A and photographing is performed using the flash emission apparatus 4B, a light emission condition of the flash emission apparatus 4B may also be added as a photographing condition to the photographing information and recorded.

As described above, according to the foregoing embodiment of the present invention it is possible to provide a photographing apparatus that, when an interchangeable lens is mounted, makes it possible to easily perform photographing, such as by displaying an image in accordance with the interchangeable lens that is actually mounted.

The present invention is not limited to the above described embodiment, and various changes and modifications thereof can be made without departing from the spirit or scope of the present invention.

What is claimed is:

1. A photographing apparatus to which a detachable interchangeable lens is selectively mounted to perform photographing, comprising:
    an image pickup section including an image pickup device that is disposed at an image forming position of the interchangeable lens;
    a recording section that is provided in the interchangeable lens and that records previously set image data and image data picked up by the image pickup section, each of the image data including an image;
    a display section that displays an image; and
    a display control section that performs display control that can switch between a first display mode that reads out an image recorded in the recording section inside the interchangeable lens and displays the image on the display section and a second display mode that displays an image that is being picked up by the image pickup section through the interchangeable lens on the display section.

2. The photographing apparatus according to claim 1, wherein image data that is recorded in the recording section inside the interchangeable lens includes sample images that can be photographed with the interchangeable lens.

3. The photographing apparatus according to claim 2, wherein:
    the interchangeable lens has an operation section for performing an operation that changes a photographing condition;
    the sample images include a plurality of images that correspond to the photographing condition with respect to the operation section; and
    in the first display mode, an image of the photographing condition that is changed at the operation section is displayed.

4. The photographing apparatus according to claim 1, wherein image data recorded in the recording section inside the interchangeable lens includes an image that is photographed with the interchangeable lens and information regarding a photographing condition for photographing the image.

5. The photographing apparatus according to claim 4, wherein the information regarding the photographing condition is displayed on the display section.

6. The photographing apparatus according to claim 4, wherein information regarding a photographing condition for photographing an image that is photographed with the interchangeable lens can be read in, and a photographing condition for photographing by the photographing apparatus can be set by means of the information.

7. A photographing apparatus to which a detachable interchangeable lens is selectively mounted to perform photographing, comprising:
    an image pickup section including an image pickup device that is disposed at an image forming position of the interchangeable lens;
    a recording section that is provided in the interchangeable lens and that records image data including an image;
    a display section that displays an image; and
    a display control section that performs display control that can switch between a first display mode that reads out an image recorded in the recording section inside the interchangeable lens and displays the image on the display section and a second display mode that displays an image that is being picked up by the image pickup section through the interchangeable lens on the display section, wherein:
    the recording section includes a security area in which security is ensured; and
    the image data can be recorded in the security area.

8. The photographing apparatus according to claim 1, wherein:
    an accessory apparatus can also be detachably mounted to the photographing apparatus; and
    the display control section changes display contents that are displayed on the display section in accordance with a function of an accessory apparatus that is detachably mounted to the photographing apparatus.

9. The photographing apparatus according to claim 8, wherein the accessory apparatus is an electronic viewfinder.

10. The photographing apparatus according to claim 9, wherein when the electronic viewfinder is mounted to the photographing apparatus, an image that is recorded in the recording section is displayed on the display section, and an image that is picked up and obtained by the image pickup section is displayed on the electronic viewfinder.

11. The photographing apparatus according to claim 9, wherein when the electronic viewfinder is not mounted to the photographing apparatus, an image that is recorded in the recording section is displayed on the display section for a predetermined time only, and after the image that is recorded in the recording section is displayed, an image that is picked up and obtained by the image pickup section is displayed.

12. The photographing apparatus according to claim 8, wherein the accessory apparatus is a flash emission apparatus.

13. The photographing apparatus according to claim 2, wherein, in the first display mode, the display control section compares a feature value of an image that is picked up and obtained by the image pickup section and a feature value of the sample images, reads out from the recording section a sample image that has a feature value that matches or is similar to a feature value of the image that is picked up and obtained by the image pickup section, and displays the sample image on the display section.

14. The photographing apparatus according to claim 2, wherein a photographic image that is photographed by the photographing apparatus in a state in which the interchangeable lens is mounted thereto can also be added to and recorded in the recording section inside the interchangeable lens.

15. The photographing apparatus according to claim 4, wherein when reading out and displaying an image that is recorded in the interchangeable lens, the display control section displays information regarding whether or not the image is photographed by an interchangeable lens that has same characteristics as the interchangeable lens.

16. A photographing apparatus to which a detachable interchangeable lens is selectively mounted to perform photographing, comprising:
 an image pickup section including an image pickup device that is disposed at an image forming position of the interchangeable lens;
 a display section that displays an image; and
 a display control section that performs display control that can switch between a first display mode that reads out previously set image data and image data picked up by the image pickup section, each of the image data being recorded in a first recording section inside the interchangeable lens and displays the image on the display section, and a second display mode that displays an image that is being picked up by the image pickup section through the interchangeable lens on the display section.

17. The photographing apparatus according to claim 16, further comprising a second recording section,
 wherein an image that is recorded in the first recording section can be recorded in the second recording section based on a predetermined operation.

18. The photographing apparatus according to claim 16, wherein:
 an accessory apparatus can also be detachably mounted to the photographing apparatus; and
 the display control section changes display contents that are displayed on the display section in accordance with a function of an accessory apparatus that is detachably mounted to the photographing apparatus.

19. A photographing control method for performing photographing by means of a photographing apparatus in which a detachable interchangeable lens is mounted to a photographing apparatus main body, comprising:
 a first display step of performing control that displays a sample image that is photographed using the interchangeable lens that is mounted or an interchangeable lens that has same characteristics as the interchangeable lens and is previously recorded inside the interchangeable lens that is mounted, by means of a display section of the photographing apparatus main body;
 a second display step of performing control that displays an image that is actually photographed using the interchangeable lens by means of the display section of the photographing apparatus main body; and
 a setting step of performing control that reads out a photographing condition for photographing the sample image, and sets the photographing condition as a photographing condition of the photographing apparatus.

20. The photographing control method according to claim 19, wherein it is further possible to change a photographing condition of the photographing apparatus that is set by the setting step, in accordance with an operation by an operation section for changing a photographing condition.

\* \* \* \* \*